United States Patent [19]

Cross

[11] 4,295,560

[45] Oct. 20, 1981

[54] MATERIAL HANDLING APPARATUS

[75] Inventor: Billy J. Cross, 3316 Cedar Crest, Pasadena, Tex. 77503

[73] Assignee: Billy J. Cross, Pasadena, Tex.

[21] Appl. No.: 69,732

[22] Filed: Aug. 30, 1979

Related U.S. Application Data

[63] Continuation-in-part of Ser. No. 949,736, Oct. 10, 1978, abandoned.

[51] Int. Cl.³ .............................................. B65G 65/10
[52] U.S. Cl. ..................................... 198/517; 198/598
[58] Field of Search ................. 414/47, 501, 502, 565, 414/567, 687, 690, 697, 912, 566; 198/302, 308, 309, 443, 445, 501–505, 507, 510, 511, 517, 520, 598, 803; 37/8

[56] References Cited

U.S. PATENT DOCUMENTS

| | | | |
|---|---|---|---|
| 944,438 | 12/1909 | Holmested | 198/308 |
| 996,913 | 7/1911 | Donaldson | 414/687 |
| 1,041,603 | 10/1912 | Dearborn | 414/565 |
| 1,095,786 | 5/1914 | Billings | 198/517 |
| 1,162,768 | 12/1915 | Greenleaf | 414/690 X |
| 1,265,729 | 5/1918 | Billings | 198/517 |
| 1,265,730 | 5/1918 | Billings | 37/8 |
| 1,265,731 | 5/1918 | Billings | 198/511 |
| 1,277,687 | 9/1918 | Billings et al. | 198/517 |
| 1,349,749 | 8/1920 | Billings | 198/517 |
| 1,377,303 | 5/1921 | Billings et al. | 198/507 |
| 1,447,275 | 3/1923 | Billings et al. | 198/511 |
| 1,473,227 | 11/1923 | Greenleaf | 414/697 |
| 1,491,788 | 4/1924 | Chance et al. | 198/517 |
| 1,520,247 | 12/1924 | Jacobsen | 414/565 |
| 1,567,080 | 12/1925 | Ranney | 414/47 |
| 1,663,917 | 3/1928 | Morgan | 414/565 |
| 1,739,624 | 12/1929 | Whamond | 414/565 |
| 1,781,895 | 11/1930 | Crawford et al. | 198/517 |
| 1,855,998 | 4/1932 | Shannon | 198/510 X |
| 1,903,674 | 4/1933 | Hauge | 198/511 |
| 1,905,472 | 4/1933 | Kraft | 198/517 |
| 2,334,323 | 11/1943 | Gilbert | 198/517 X |
| 2,366,480 | 1/1945 | Beckwith | 414/565 |
| 2,424,822 | 7/1947 | Hartley | 414/565 |
| 2,515,965 | 7/1950 | Nurnberg | 198/445 |
| 2,551,427 | 5/1951 | Ellefson | 198/309 |
| 2,792,099 | 5/1957 | Hefft | 198/443 |
| 3,073,431 | 1/1963 | Davis et al. | 198/803 |
| 3,095,080 | 6/1963 | Wagner | 198/302 |
| 3,127,002 | 3/1964 | Tempe | 198/517 |
| 3,206,048 | 9/1965 | Weiss et al. | 414/565 |
| 3,241,693 | 3/1966 | Ströker | 414/565 |
| 3,278,062 | 10/1966 | Densmore | 414/502 |
| 3,391,776 | 7/1968 | Hancock et al. | 198/517 X |
| 3,417,851 | 12/1968 | Gonski et al. | 198/308 |
| 3,547,287 | 12/1970 | Cunningham, Sr. | 414/565 |
| 3,730,367 | 5/1973 | Heffington | 414/501 |
| 3,907,093 | 9/1975 | Skibo | 198/511 |
| 3,909,963 | 10/1975 | Patel | 414/912 X |
| 4,011,936 | 3/1977 | Hall | 198/517 |
| 4,069,928 | 1/1978 | Teske et al. | 198/598 X |

Primary Examiner—Leslie J. Paperner
Assistant Examiner—Terrance L. Siemens
Attorney, Agent, or Firm—Kenneth H. Johnson

[57] ABSTRACT

A self-contained, moveable material handling apparatus is characterized by a chassis having a material conveyance surface mounted for rotation with respect to the central vertical axis thereof. A deck is also mounted for rotation with respect to the chassis, independently of the material conveyance surface. A loading boom, having a loading device on the end thereof, is mounted to the deck for rotation about the central vertical axis of the chassis. The boom is also pivotable about a horizontal axis and extendable and retractable along its own axis. The loading device and the boom cooperate to load material from the interior of a carrier onto the material conveyance surface. The surface rotates the material until it is deflected from the surface by a deflector conveyor onto a carry-off conveyor. The speed of the material conveyance is less than the speed of the deflector conveyor, which speed is less than the speed of the carry-off conveyor.

63 Claims, 21 Drawing Figures

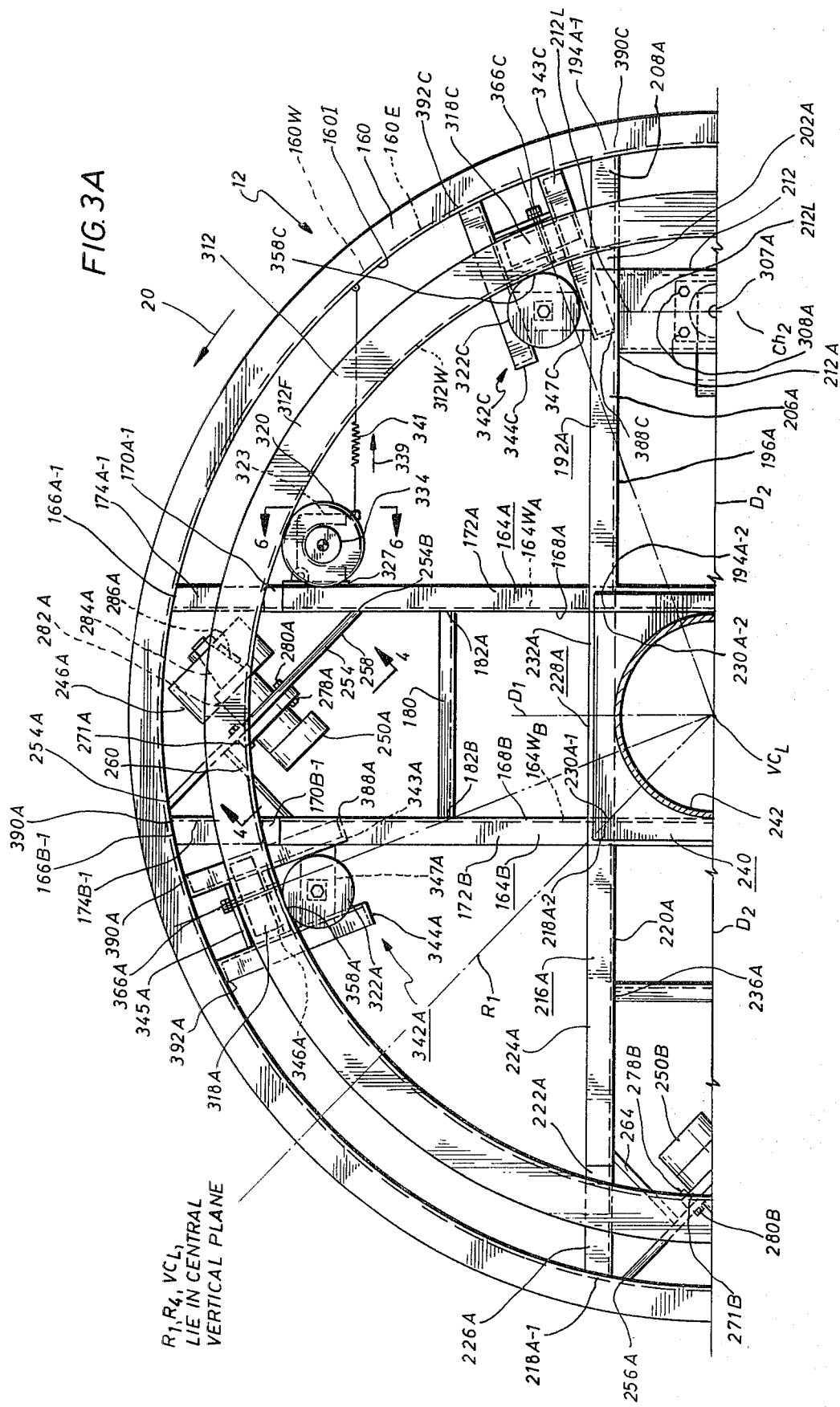

MATERIAL HANDLING APPARATUS

CROSS-REFERENCE TO RELATED APPLICATION

This application is a continuation-in-part of Application Ser. No. 949,736, filed Oct. 10, 1978, titled "LOADING APPARATUS AND SYSTEM", now abandoned.

BACKGROUND OF THE INVENTION

1. Field of the Invention

This invention relates to material handling vehicle moveable into and out of a cargo carrier to unload sacked or loose material therefrom.

2. Description of the Prior Art

The unloading of sacked or bulk (loose) material from the cargo carrier in which it is transported is a timeconsuming, labor-intensive task. Moreover, it is physically taxing and difficult labor to move the cargo from its position of repose within the carrier to another location.

Additional difficulty and exertion is required in order to reach and move that portion of the cargo disposed in a relatively inaccessable portion of the carrier. For example, in the case of center-door railroad boxcar, the easiest portion of the unloading task is the movement of that cargo disposed in next adjacency to the boxcar door. More difficult is the movement cargo disposed in regions of the boxcar disposed distant from the door. For the unloading of this material, it is required that laborer "turn the corner" as he both enters and exits the boxcar while unloading the material disposed at each end thereof.

Efforts to facilitate the unloading task typically include the provision of conveyors which extend from the interior of the boxcar in the vicinity of the region where the laborer is unloading cargo to the location in which the offloaded cargo will be temporarily stored. However, there are difficulties attendant upon this conveyor arrangement. As the worker advances toward the regions of the boxcar further from the door additional conveyor elements must be laid. Further, once the car is unloaded there still remains the task of rearranging the conveyor system so that the next car in the train may likewise be unloaded. It may occur that the effort required to be expended in order to rearrange the conveyor system for use in connection with the unloading of the next car vitiates the benefits provided by the conveyor system.

There are devices in the material handling art which are believed to embody attempts to mechanize or otherwise expedite the transfer of material from one position to another. Exemplary of a device utilized to transfer bulk cargo, as loose coal, from one position to another is the device shown in U.S. Pat. No. 944,438 (Holmested). This device appears to utilize a rotary turntable and a conveyor extending perpendicularly to the surface thereof. The turntable and the conveyor are both energized and material shoveled onto the forward edge of the turntable is rotated by the surface thereof to a position where it may be deflected toward a rearwardly extending conveyor by the operation of the deflector.

This device further appears to require the physical movement of the shovel (provided on the forward edge of the device) into the loose material to be conveyed or else requires the presence of a laborer in order to introduce material onto the forward edge of the turntable.

The device shown in the U.S. Pat. No. 3,127,002 (Tempe) appears to disclose a segmented wheel mounted for rotation on a surface. A scraper is provided which appears to be extendable into the mass of material to be on-loaded into the segmented wheel. Retraction of the scraper pulls material into the compartment of the wheel then presented toward the scraper blades. The wheel is then rotated so as to present the next segmented compartment thereof to the scraper so that a repeated operation of the scraper may introduce a further charge of material into the wheel. That is, it appears the movement of the wheel is dependent upon the charging of material thereinto.

Other devices in the art also appear to disclose the utilization of rotating turntables to convey material from one position to another. For example, U.S. Pat. No. 1.567,080 (Ranney) appears to disclose a device for piling or stacking sheets of material which utilizes a circular tablelike track. The device shown in the U.S. Pat. No. 3,073,431 (Davis et al.) appears to utilize a rotatable platform which is compartmentalized by partitions vertically upstanding from the surface thereof. The platform appears to be rotatable with respect to a stationary surface.

Those familiar with airline travel will also recognize that most major airports provide some form of rotational material conveyance surface by which passenger luggage may be presented for retrieval. One such luggage device introduces luggage upwardly from a vertical central section onto an inclined conelike conveyance surface which surface, as it is rotated, carries the luggage therealong.

Other devices which appear to utilize a rotating member for conveyance of material is the coal-loading device shown in U.S. Pat. No. 1.781,895 (Crawford et al.) and the bale-loading device shown in U.S. Pat. No. 2,551,427 (Ellefson). The device shown in U.S. Pat. No. 2,515,965 (Nurnberg) appears to utilize a rotating member in an apparatus for transporting bottle caps, while the device shown in U.S. Pat. No. 2,792,099 (Hefft) appears to relate to a log-feeding apparatus.

It also appears to be known to dispose a digging or trenching implement on a platform which is itself rotatable with respect to a vertical axis of the vehicle on which the implement is carried. Believed exemplary of such apparatus are those shown in U.S. Pat. Nos. 1,162,768 and 1.473,227 (both to Greenleaf), and U.S. Pat. Nos. 1,265,730 and 1,265,731 (both to Billings). Also believed to embody a disclosure of a digging implement on a platform rotatable with respect to the vehicle carrying the same are U.S. Pat. Nos. 1,277,687 and 1.446,275 (both to Billings et al.). The devices shown in U.S. Pat. No. 1,520,247 (Jacobsen) and U.S. Pat. No. 3,547,287 (Cunningham, Sr.), also appear to disclose a digging implement rotatable with respect to the apparatus on which it is mounted.

The device shown in U.S. Pat. No. 3,730,367 (Heffington) appears to be a somewhat more contemporary embodiment of the same principle and is utilized in the enviroment of a mobile refuse retriever wherein a hydraulic crane is disposed on a truck.

It is believed to be advantageous in the context of the unloading of material (whether sacked or bulk) from a cargo carrier to provide a self-propelled, moveable material handling vehicle adapted to move freely about the surface of a loading dock or railroad siding and into and out of the cargo carrier in order to expedite the unloading of material therefrom. It is also believed to be advantageous to provide such a vehicle that is appropriately controllable by a single operator. Further, advantage is believed derived if the vehicle has provided thereon a loading boom extensible and retractable along its own axis, rotatable in a horizontal plane about a vertical axis extending from the apparatus and pivotal about a horizontal axis (defined with respect with the apparatus) in a vertical plane. The motions are believed desirable in order to reach and displace material from its position of repose within the carrier.

It is also believed to be of advantage to provide the material handling vehicle with a rotatable material conveyance surface mounted such that when material is disposed thereon (as by the action of the boom and loading device) that material may be rotated to a position where it may be deflected therefrom by a suitable deflector device and onto an appropriately positioned carry-off conveyor. It is believed to be most advantageous to provide the carry-off conveyer in a position moveable with respect to the chassis of the vehicle so that the outboard end of the conveyor may always be oriented toward the entrance (door) of the cargo carrier.

SUMMARY OF THE INVENTION

This invention relates to a material handling vehicle adapted to facilitate the unloading of cargo from a cargo carrier, as a boxcar, or a trailer. The vehicle is movable in any direction about a workfloor and into and out of the carrier itself under the control of an operator. The vehicle may be powered by any suitable prime mover, as a diesel engine, disposed thereon. The diesel engine provides motive energy for the movement of the vehicle, as well as the energy necessary to operate all elements provided on the vehicle. The vehicle is, therefore, a fully movable, selfcontained material handling device.

In the preferred embodiment of the invention, the vehicle includes a chassis, or framework, to which the means for moving the vehicle are mounted. It is preferred that two drive wheels, each powered by a hydraulic motor, are mounted to the chassis. Further, at least one but preferably two idler wheels, or casters, are as mounted to the chassis. Of course, other suitable moving means, as treads, tracks or wheel and rails may be utilized as the means for moving the vehicle.

Mounted for rotation (either continuous or intermittent) with respect to the chassis is a material conveyance surface, or turntable. The hydraulic motor drive for the material conveyance surface, or turntable, is also mounted to the chassis. The material conveyance surface carries material (whether sacked or loose) deposited thereon in a rotary direction until the material is deflected from the conveyance surface by a suitable deflector conveyor. In this manner, the material may be carried on the conveyance surface (even "around the corner" defined by the path from the end regions of a boxcar through the side door thereof). The material deflected by the deflector conveyor from the material conveyance surface is also transported by a carryoff conveyor appropriately disposed so as to receive deflected material. Preferably, the deflector conveyor and the carryoff conveyor are movable with respect to the chassis so as to be at all times oriented toward the access port (e.g., side door) of the carrier (e.g., boxcar).

A loading boom, preferably having a loading device as a scoop mounted on the end thereof, is mounted for various ranges of motion with respect to the chassis. The boom is movable in a horizontal plane defined about a vertical axis extending from the chassis. It is peferred that the vertical axis be the central vertical axis of the apparatus. The boom is also pivotable in a vertical plane about a horizontal axis entending from the chassis. In the preferred case, this horizontal axis intersects the central vertical plane of the apparatus along the central vertical axis of the apparatus.

The boom is also extendable and retractable along its axis. Further, it is preferred that the loading device be rotatable about the axis of the boom and also pivotable with respect to the end thereof. Any of these motions of the boom and scoop may occur simultaneously, individually, in any combination and without regard to the motion of the vehicle or of the material conveyance surface. The speeds of the turntable, deflector conveyor and carry-off conveyor are interrelated, with the speed of each succeeding element greater than the speed of the preceding element.

The boom and loading device is operable to displace material from its position of repose within the carrier onto the material conveyance surface. The surface is preferably movable independently of the loading of material thereonto. To assist in the movement of material onto the conveyance surface, there is provided a flared skirt extending from the workfloor. The skirt may be lifted and lowered with respect to the chassis by a suitable hydraulic operator.

All of the hydraulic connections from the pump/compressor (powered by the diesel) to operators disposed below the deck are facilitated by a swivel connector mounted in the central post on which the deck is supported for rotation with respect to the chassis.

BRIEF DESCRIPTION OF THE DRAWINGS

The invention will be more fully understood from the following detailed description thereof, taken in connection with accompanying drawings, which form a part of this application and in which:

FIGS. 3a and 3b are plan views of the structural arrangement of the chassis for the material handling apparatus in accordance with the instant invention split along the same diameter $D_2$ for convenience of illustration;

FIG. 16 is a side view, with parts broken for clarity, of the mounting arrangement for the hydraulic motor adapted to rotate the scoop of a material handling apparatus in accordance with the instant invention;

FIG. 17 is a view taken along section lines 17—17 of FIG. 16;

DETAILED DESCRIPTION OF THE INVENTION

Figure 1:
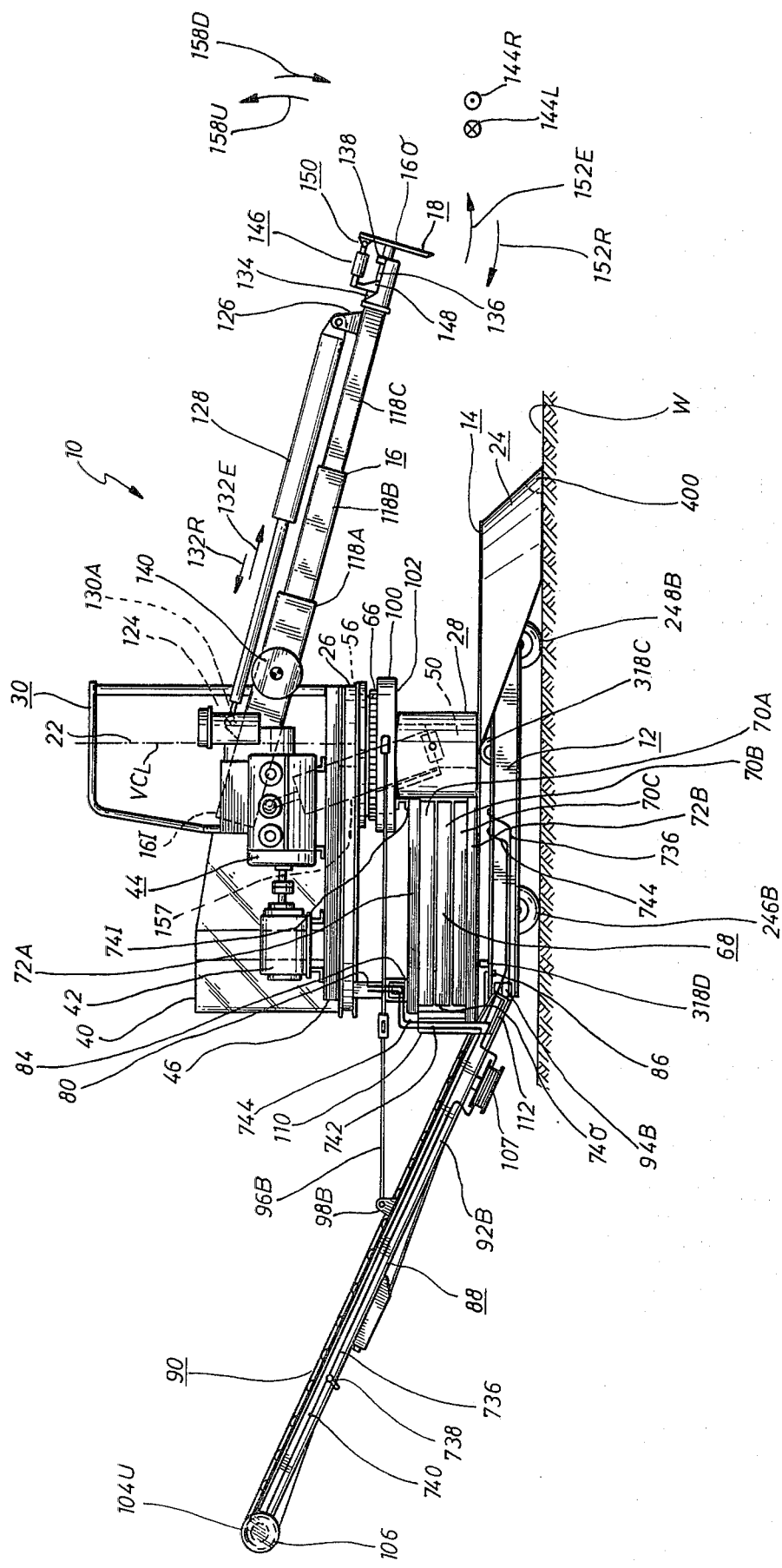
FIG. 1 is a side elevation view of the material handling apparatus in accordance with the instant invention.

Throughout the following description, similar reference characters refer to similar elements in all Figures of the drawings.

Figure 2:
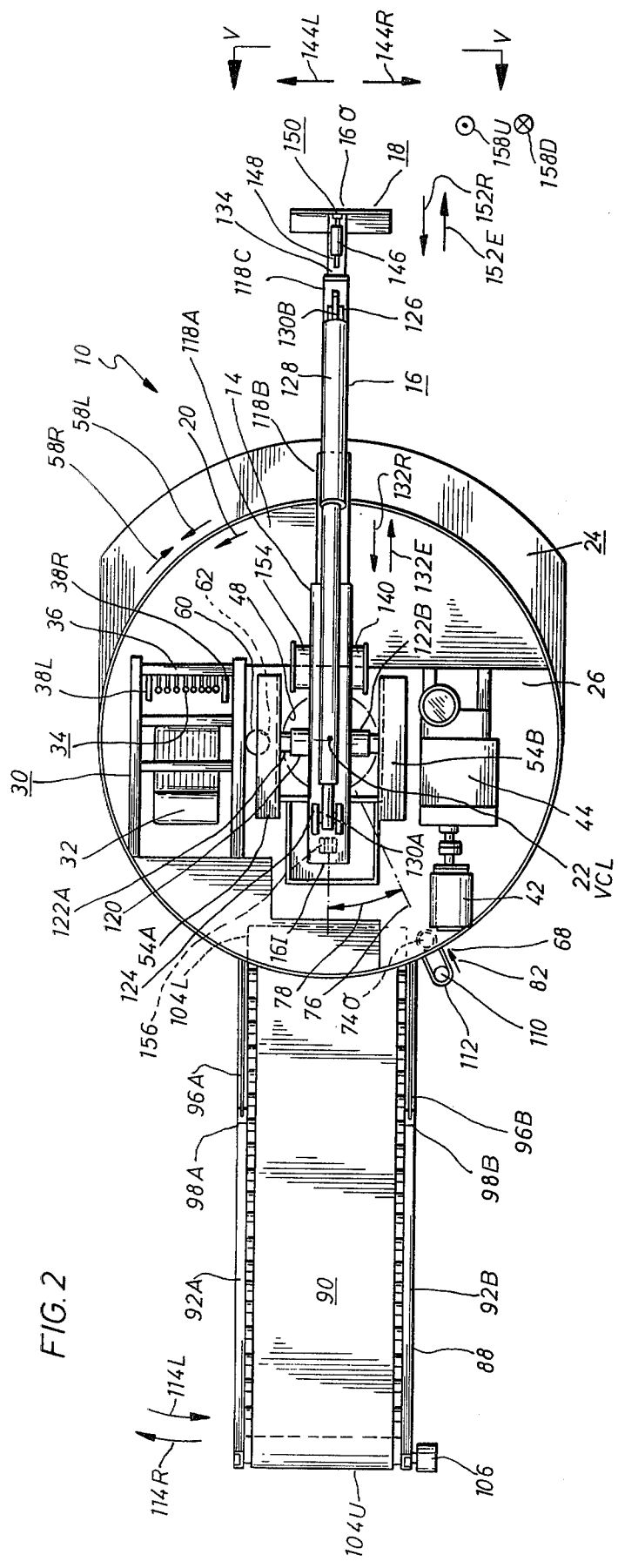
FIG. 2 is a plan view of the material handling apparatus shown in FIG. 1.

With reference to FIGS. 1 and 2, respectively shown are a side elevation and a plan view of a material handling apparatus, generally indicated by reference numeral 10, embodying the instant invention.

The material handling apparatus 10 in accordance with this invention is useful for the unloading of cargo or material from any cargo carrier, especially rail cars, trailers, or the like, in an efficient and expeditious fashion. The apparatus 10 is especially adapted for the handling of sacked cargoes, as rice, coffee, flour, or sugar, but it is also useful for the unloading of loosely carried, discrete bulk cargoes, as wood chips and the like. In the preferred form, the material handling apparatus 10 is a movable, self-propelled vehicle carrying all elements and motive sources therefor necessary to enable an individual operator to handle the unloading of material from a boxcar or trailer.

The material handling apparatus generally includes a chassis 12 which defines the structural framework of the apparatus, a material conveyance surface 14 (preferably in the form of a rotary turntable) and a loading boom 16 mounted to, but extendable from, the chassis 12 for moving cargo from its position of repose within the carrier onto the material conveyance surface 14.

The loading boom 16 has disposed at its outer end 160 a material loading device, generally indicated by reference numeral 18. The loading device 18 may take any of a variety of forms, primarily dependent upon the form of the material being handled. The device 18 may be in the form of a guide plate (as shown in FIGS 1, 2, 16 and 17), either with or without a scooped depression therein. Alternately, the device 18 may be curved, hooked, shovel-like or any one of other convenient shapes. It is also within the contemplation of this invention to dispose as the device 18 a magnetic or a pneumatic device at the outer end 160 of the boom 16, if the nature of the material being handled so admits. Hereinafter, the loading device 18 will be referred to as the "scoop," it being appreciated that the mentioned alternatives discussed above, and equivalents thereto, are comprehended within that term.

The structural details of the chassis 12 are described in detail in connection with FIGS. 3 to 10. It should be appreciated, of course, that any arrangement of elements adapted to provide a structural framework for the apparatus 10 is suitable for use with and lies within the contemplation of the instant invention.

The material conveyance surface, or turntable, 14 is supported for rotary motion with respect to the chassis 12 on suitable support wheels 318, two of which (318C and 318D) are visible in FIG. 1. Although the manner in which the material conveyance surface 14 is supported with respect to the chassis 12, as well as the manner in which the source of motive energy for the surface 14 is supported on the chassis 12 and interconnected in a driving relationship with the surface 14 is set out in full detail hereafter, it suffices at this point to state that the material conveyance surface 14 is mounted for rotary motion at a predetermined rate in an angular direction 20 (FIG. 2) about an axis of rotation 22 (conveniently, but not necessarily the vertical axis VCL of the apparatus 10). The rate of rotation of the material conveyance surface 14 is independent of the operation of the loading boom 16 which deposits material thereonto. The rotation of the surface 14 may be continuously occurring (at a preferred speed on the order of nine revolutions per minute), or may be intermittantly occurring. In the latter case, the material conveyance surface 14 is periodically indexed, or incremented, a predetermined angular amount at a predetermined time interval.

Mounted to the chassis 12 at a convenient location thereon is suitable means for moving the apparatus 10. In the preferred embodiment, two apparatus drive wheels 246 (one of which 246B is visible in FIG. 1) and two idler wheels 248 (one of which 248B is visible in FIG. 1) are mounted to the chassis 12. Of course, it is understood that any means for moving the apparatus 10 (as for example, rail and wheels, tracks, treads) and the source of motive energy (prime mover) therefor may be utilized and lie within the contemplation of the invention. The prime mover may also take any form, as, for example, an electric, hydraulic, pneumatic or internal combustion device.

The deposition of cargo, whether bulk (loose) or sacked, upon the material conveyance surface 14 by the operation of the loading boom 16 and the scoop 18 is facilitated by an inclined skirt 24. The skirt 24 is mounted to the chassis 12 and inclines forwardly from approximately the front half of the apparatus 10 from the height of the material conveyance surface 14 to a predetermined close clearance to the work floor. It is preferred that the skirt 24 define a skirt angle 400 of approximately thirty degrees (FIG. 9) with respect to the workfloor. It is to be noted that as the skirt angle 400 is reduced below thirty degrees, the horizontal distance 401 (FIG. 9) between the lower edge 24L of the skirt and the edge of the chassis frame increases, thus necessitating an accommodation be made between skirt angle and horizontal distance. Likewise, as the skirt angle 400 is increased above thirty degrees, it should be recognized that the exterior surface 25E (FIG. 9) of the skirt may become too steep to assist in the moving of material onto the surface 14. It has been observed that a skirt angle of approximately 45° is too steep an incline for the skirt's purpose.

The skirt 24 performs a function not unlike that exhibited and performed by the "cow catcher" usually provided on a locomotive. Basically, the skirt 24 provides a surface over which material may be guided by the loading boom 16 and the scoop 18 from the workfloor W onto the material conveyance surface 14. In the preferred embodiment, the skirt 24 may be lifted and lowered with respect to the chassis 12. The structural elements which facilitate this skirt lifting motion are described in detail in connection with FIGS. 9 and 10.

An operating deck 26 is supported above the material conveyance surface 14 on a central post 28 extending upwardly from the chassis 12. Preferably, but not necessarily, the axis of the central post 28 is concentric with the axis of rotation 22 and, therefore in the preferred embodiment, with the vertical axis VCL of the apparatus. The deck 26 has mounted thereon an operator's cab 30 in which an operator's chair 32 is disposed. The various control levers 34 of a manifold control valve bank (or control panel) 36 and pedals 38 for the operation of the apparatus are disposed within the cab 30. The function controlled by each of the control levers 34 in the panel and the pedals 38 will be made clearer herein in connection with the discussion of the schematic diagram of the hydraulic control system of the apparatus 10, set forth in connection with FIG. 18. It should be appreciated that although the preferred embodiment of the invention utilizes hydraulic operators to effect the various motions of the various portions of the apparatus 10, other equally effective electrical or pneumatic operators may be utilized and so are to be construed as lying remain within the contemplation of the invention.

Mounted on the deck 26 in any convenient location, as adjacent the rear portion thereof, is a reservoir tank 40 in which the motive fluid for the hydraulic operators, typically oil, or automatic transmission fluid is stored. Also mounted in any convenient position, as along one side of the apparatus, is the hydraulic fluid pump/compressor 42, with the energy source (prime mover) 44 therefor and for the apparatus 10 being operatively coupled thereto. Found suitable for use as the hydraulic pump/compressor 42 is an atmospheric inlet piston pump such as that sold by Hydreco under model number AP40. The source, or prime mover, 44 preferably takes the form of a diesel engine, as the three cylinder, sixty horsepower diesel engine sold by Hatz under model number D108. The pump/compressor 42 and the prime mover 44 therefor may be mounted on a suitable platform 46 disposed on the deck 26. A gasoline powered internal combustion engine has also been found suitable for use as the prime mover 44.

Pressurized hydraulic oil is conducted from the pump/compressor 42 through the bank of valves 36 controlled by the various levers 34 and pedals 38 disposed in the cab 30. Those pressurized fluid and return lines which service the various hydraulic operators physically disposed below the deck 26 pass from the valve bank 36 through an access aperture 48 provided in the deck 26. The lines are connected to a hydraulic swivel 50 supported in the central post 28 in the manner described in connection with FIG. 14. The lines emanate from the swivel 50 below the deck 26 and connect to and from the appropriate operators. This arrangement is believed advantageous in eliminating the tangling of the hydraulic lines when the deck 26 is rotated. Others of the hydraulic lines pass from the valve bank 36 or the control pedals 38 directly to their associated operators. To avoid tangling, take-up reels (as in 140 and 154) may be provided. Since the complete hydraulic circuitry for the apparatus 10 is set forth in detail in connection with FIG. 18, those hydraulic connection hoses or conduits visible in the FIGS. 1 and 2 are identified by the same reference characters used to identify them in the hydraulic diagram.

In the preferred embodiment of the invention, the deck 26 provides a base for the mounting of the loading boom 16, the boom mounting trunnions being generally designated by the reference character 54. The deck 26 is itself mounted atop the central post structure 28 on suitable a thrust and rotary bearing 56 (shown in FIG. 12) which facilitates rotary movement of the deck 26 with respect to the chassis 12 in the clockwise or counter-clockwise angular directions respectively indicated by reference arrows 58R and 58L in FIG. 2.

The deck 26 is preferably angularly movable in a full 360° arc. The movement of the deck 26 in the indicated directions 58 is controllable by the operator from the cab 30 through the manipulation of the pedals 38. Manipulation of the left pedal 38L (FIG. 1) energizes a hydraulic motor 60 to effect a left-hand turn (in the direction of the arrow 58L) of the deck 26. Conversely, manipulation of the right pedal 38R effects a right hand turn (in the direction of the arrow 58R) of the deck 26. The motor 60 is mounted on the deck 26 adjacent one of the trunnions 54A (FIG. 13) with the body of the motor 60 projecting through an opening 62 provided in the deck 26. A planetary pinion gear 64 is disposed on the motor 60, the pinion 64 being arranged such that rotation of the motor 60 causes the pinion 64 to engage the teeth of a rack 66 circumferentially disposed adjacent the upper end of the central post 28 and rotate the deck 26 with respect thereto and to the vertical central axis VCL of the apparatus. Suitable for use as the motor 60 is that manufactured by Char-Lynn and sold under model number 2000 Series, 104-1001.

The removal of material deposited by the loading boom onto the material conveyance surface 14 (after that material has been angularly displaced by the rotary motion of the surface 14 in the direction 20) is facilitated by a deflector conveyor 68. The deflector conveyor 68 includes belts 70A, 70B and 70C supported between sidewalls 72A and 72B. The conveyance surface of the conveyor 68 (defined by the surfaces of the belts 70) is disposed substantially perpendicularly to and within a predetermined close vertical clearance distance of the material conveyance surface 14. Of course, the dimension of the vertical clearance distance depends upon the material being carried on the material conveyance surface 14. The inner end 74I of the deflector conveyor 68 is movably mounted to the central post 28. (The inner end 74I is attached to a flange connected to a teflon bearing 100 mounted on the collar 102 of the central post.) The outer end 74O of the deflector conveyor 68 is radially outwardly of the outer edge of the material conveyance surface 14. The longitudinal axis 76 of the deflector conveyor 68 (which passes through the inner end 74I and outer end 74O thereof) defines a predetermined angle 78 with the central vertical plane of the apparatus (a plane parallel to the plane of FIG. 1 containing the central vertical axis VCL) preferably on the order of thirty degrees. The belts 70 of the deflector conveyor 68 are rotated by a hydraulic motor 80 in the direction of arrow 82. The motor 80 is mounted on a post 84 supported by the sidewall 72A of the deflector conveyor 68.

It has been observed that if a deflecting device other than a conveyor is used, the angle that the deflecting device must define with respect to the central vertical plane of the apparatus 10 must exceed the angular relationship exhibited by the deflector conveyor 68 shown in FIG. 2. This increased angularity with respect to the central vertical plane is usually defined by eccentrically mounting the inner end of the deflecting device with respect to the surface 14. Unless provision is made to prevent movement of material between the inner end of the deflecting device and the central post, the use of deflecting devices other than conveyors is not preferred.

Attached by suitable latches 86 which grasp the chassis 12 is a carry-off conveyor 88. The carry-off conveyor 88 includes a belt 90 supported on rollers between sidewalls 92A and 92B. The carry-off conveyor 88 supported in an upwardly inclining relationship with the chassis 12 by feet 94 abutting the chassis 12. The carry-off conveyor 88 is maintained in the upwardly inclined position shown in FIG. 1 by a pair of guy rods 96 disposed between turnbuckles 98A and 98B respectively provided on each of the sidewalls 92 and a teflon bearing 100 wrapped about an enlarged collar 102 on post 28. The lower end 104L of the carry-off conveyor 88 lies inwardly of the outer end 74O of the deflector conveyor 68 so as to receive thereon materials deflected from the conveyance surface 14 by the action of the deflector conveyor 68. Motive force for the carry-off conveyor 88 is provided by a suitable hydraulic motor 106 mounted to the carry-off conveyor 88 at the outboard upper end 104U thereof. Suitable for use as each of the motors 80 and 106 are those manufactured by Char-Lynn, H Series, sold under model number 101-1026-007. A hose reel 107 may be provided on the carry-off conveyor 88. A suitable reel is that manufactured by Cascade Corp. and sold under model number C64-6043.

In the preferred embodiment of the invention, the deflector conveyor 68 is mounted to an upstanding post 110 which is supported by a bracket 112 affixed to a sidewall 92B of the carry-off conveyor 88. Also in the preferred embodiment, the carry-off conveyor 88 is angularly movable with respect to the chassis 12 in the directions of reference arrows 114. This freedom of angular movement of the carry-off conveyor 88 is important when working in confined areas (as inside a railroad boxcar) to insure that the outboard end 104U of the carry-off conveyor 88 is at all times directed toward the entrance to the confined area (i.e., the door of the boxcar.) Of course, as seen from the Figures, complete angular freedom of motion for the carry-off conveyor 88 with respect to the chassis 12 is precluded due to the presence of the skirt 24 depending from the front half of the chassis 12. It should be appreciated, however, that with the inner end 74I of the deflector conveyor 68 being made relocatable to any predetermined angular position (within a range of approximately 180°) with respect to the outer surface of the central post 28, and with the deflector conveyor 68 mounted to the sidewall 92B of the carry-off conveyor 88 by the post 110 and the bracket 112, the deflector conveyor 68 and the carry-off conveyor 88 may move as a unit to occupy various angular orientations within a range of approximately the rear 180° as measured with respect to a vertical central axis VCL of the apparatus 10.

The speeds of rotational movement of the material conveyance surface 14, deflector conveyor 68 and carry-off conveyor 88 are preferably interrelated. In the preferred operative mode of the invention, the greatest speed at which a unit of material (e.g., one sack or one particle of loose material) is conveyed by the surface 14 is arranged to be less than the speed at which that same unit of material is displaced by the surface of the deflector conveyor 90. This relationship is believed advantageous in avoiding a buildup of backlog of material on the surface of the surface 14. Further, the speed at which the unit of material is displaced by the surface of the carry-off conveyor 90 is preferably set to exceed the speed at which the unit of material is deflected thereonto by the deflector conveyor 88. By interrelating the speeds of these elements in this way congestion at the intersection between the deflector conveyor 68 and the carry-off conveyor 88 is believed to be avoided. The particular preferred speed relationship is such that if the material conveyance surface 14 (at a point six inches from the outside edge) moves at 285 feet per minute, the deflector conveyor 68 moves at 300 feet per minute and the carry-off conveyor means at 315 feet per minute.

Figure 18:
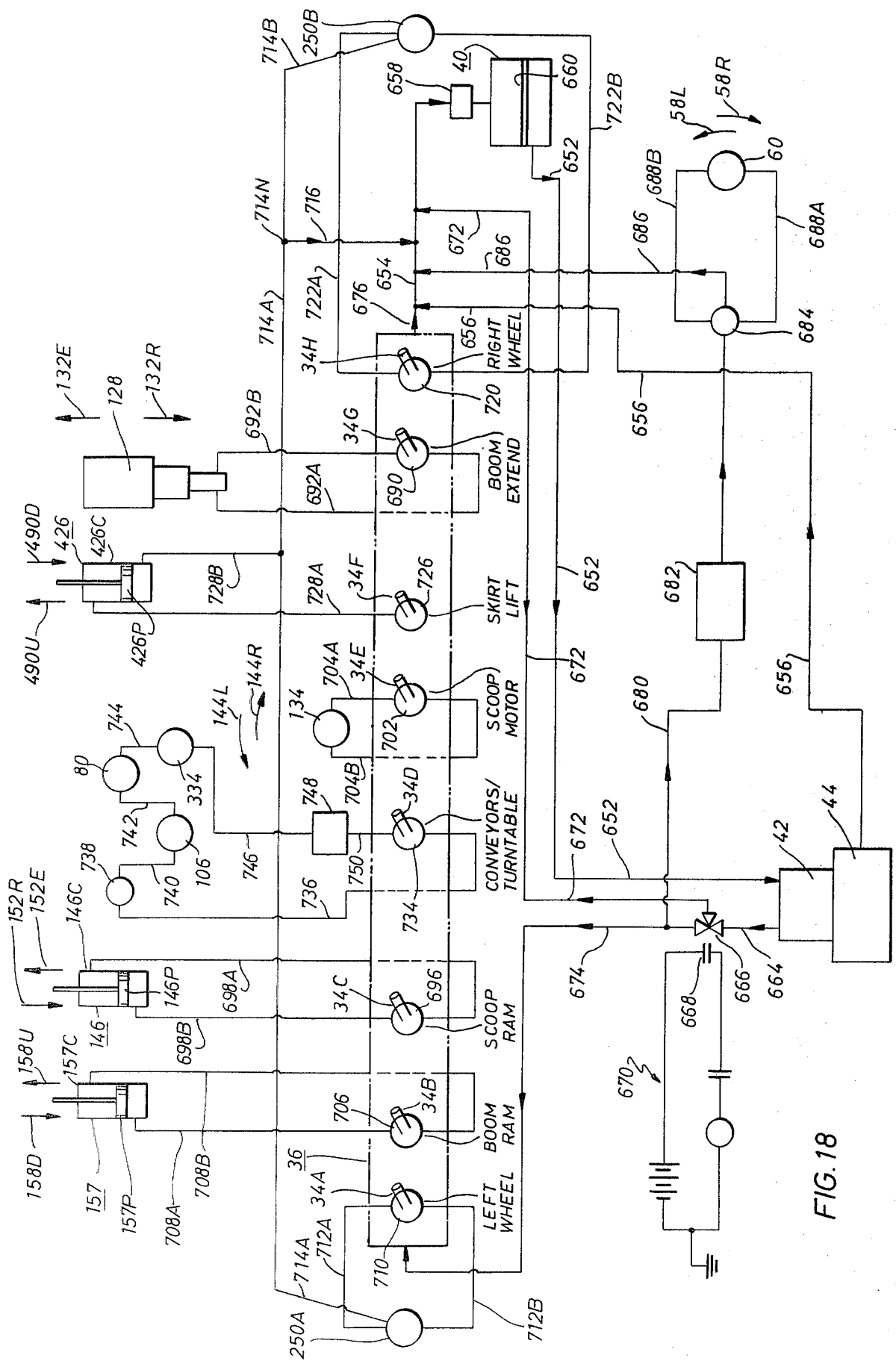
FIG. 18 is a schematic diagram of the hydraulic circuitry of the material handling apparatus in accordance with the instant invention.

In the preferred embodiment the desired speed relationships between the material conveyance surface 14, the deflector conveyor 68 and the carry-off conveyor 88 is achieved by series-connecting the inlet of the hydraulic motor 106 (for the carry-off conveyor 88) closest to the outlet of the pump/compressor 42, with the outlet of the motor 106 next-connected to the inlet of the motor 80 (for the carry-off conveyor 68), with the outlet of the motor 80 next-connected to the inlet of the hydraulic motor drive for the material conveyance surface 14 (the motor 334 shown in FIG. 6), and with the outlet of the last-mentioned motor connected so as to complete the hydraulic circuit loop (see FIG. 18). Some of these connections are indicated in FIGS. 1 and 2, with the reference characters of the connections keyed to the hydraulic diagram of FIG. 18.

The loading boom 16 is comprised of a series of telescoping members 118A, 118B and 118C, each member being substantially rectangular in cross section. The outermost telescoping member 118A is provided with a collar 120 from which project sidewise extending axles 122A and 122B. The axles 122 are received in the openings of the trunnions 54A and 54B mounted on the deck 26 to thereby form a pivotal mounting the boom 16. The boom 16 pivots in a series of vertical planes (one of which is parallel to the plane of FIG. 1) emanating from the central vertical axis VCL about a horizontal axis of rotation defined through the axles 122 mounted in the trunnions 54 on the deck 26. Also disposed on the outer telescoping member 118 of the boom 16 just axially rearwardly of the collar 120 is an inner mounting clevis 124 provided for a purpose noted herein. Longitudinally extending races (not shown) are provided along confronting interior surfaces of the member 118A. The races on the interior of the member 118A receive longitudinally extending lugs provided on the exterior of the middle telescoping member 118B. The interior of the middle member 118B is provided with longitudinally extending races along confronting interior surfaces thereof. The races on the interior of the middle telescoping member 118B receive longitudinal lugs provided on the exterior of the inner telescoping member 118C. An outer mounting clevis 126 is provided along the exterior top surface of the innermost telescoping member 118C.

A hydraulic ram 128 is secured at its first end 130A to the inner clevis 124 provided on the outermost telescoping member 118A and at its second end 130B to the outer clevis 126 on the innermost telescoping member 118C. Suitable for use as the ram 128 is that having a telescoping cylinder manufactured by Redick Corp. under their drawing number 7781. The hydraulic connections for the ram 128, shown in the hydraulic diagram of FIG. 18, extend from the valve bank 36 in the cab 30 to the inner end 130A of the cylinder of the ram 128. Actuation of the ram 128 effects telescoping extension and retraction of the loading boom 16 along the axis thereof in the direction of reference arrows 132E and 132R, respectively. In this manner, the scoop 18 mounted to the distal end of the loading boom 16 may be extended and retracted to bring materials to be loaded to the materials conveyance surface 14.

As also seen in detail in FIGS. 16 and 17, the outermost axial end 160 of the boom 16 receives and supports a hydraulic motor 134. The motor 134 (such as that manufactured by Flo-Tork under model number 1800-180) is keyed to a rotatably mounted coupling 136 at the distal end of which, as at 138, is pivotally mounted the scoop 18. The hydraulic connections for the motor 134, also shown in the hydraulic diagram of FIG. 18, extend to the motor 134 from the valve bank 36, over a spring-loaded hose wheel 140, such as that sold by Cascade under model number C64-6041, mounted on the side of the boom 16. The playing and reeling of the hydraulic lines to motor 134 as the boom 16 is extended or retracted is automatically accommodated by reel 140. Actuation of the motor 134 permits the coupling 136 (having the scoop 18 attached thereto) to rotate about the longitudinal axis of the boom 16 in the clockwise and counter-clockwise directions, respectively indicated by direction of reference arrows 144R and 144L (as seen in FIG. 17 and as viewed along view lines V—V in FIGS. 1 and 2). It is also to be noted that the description of the motor 134 at the outward end of the boom 16 avoids the necessity of disposing bulky hydraulic operators on the deck 22 in order to effect the rotation of the scoop 18.

A small hydraulic ram 146, such as that manufactured by Shaeffer Corp. under model number HHC4, is mounted between an ear 148 disposed on the innermost telescoping member 118C and a pivotal interconnection 150 on the scoop 18. Energization of the ram 146 reciprocates the piston rod 146P thereof longitudinally of the ram 146 to effect the pivotal movement of the scoop 18 in the extension and retraction directions in the direction of reference arrows 152E and 152R, respectively. The hydraulic lines 698 (FIG. 18) to the ram 146 extend over a hose reel 154 (sold by Cascade Corp. under model number C64-6040) mounted on the opposite side of the boom 16 from the reel 140. The reel 154 automatically accommodates the extension and retraction of the boom 16.

Figure 12:
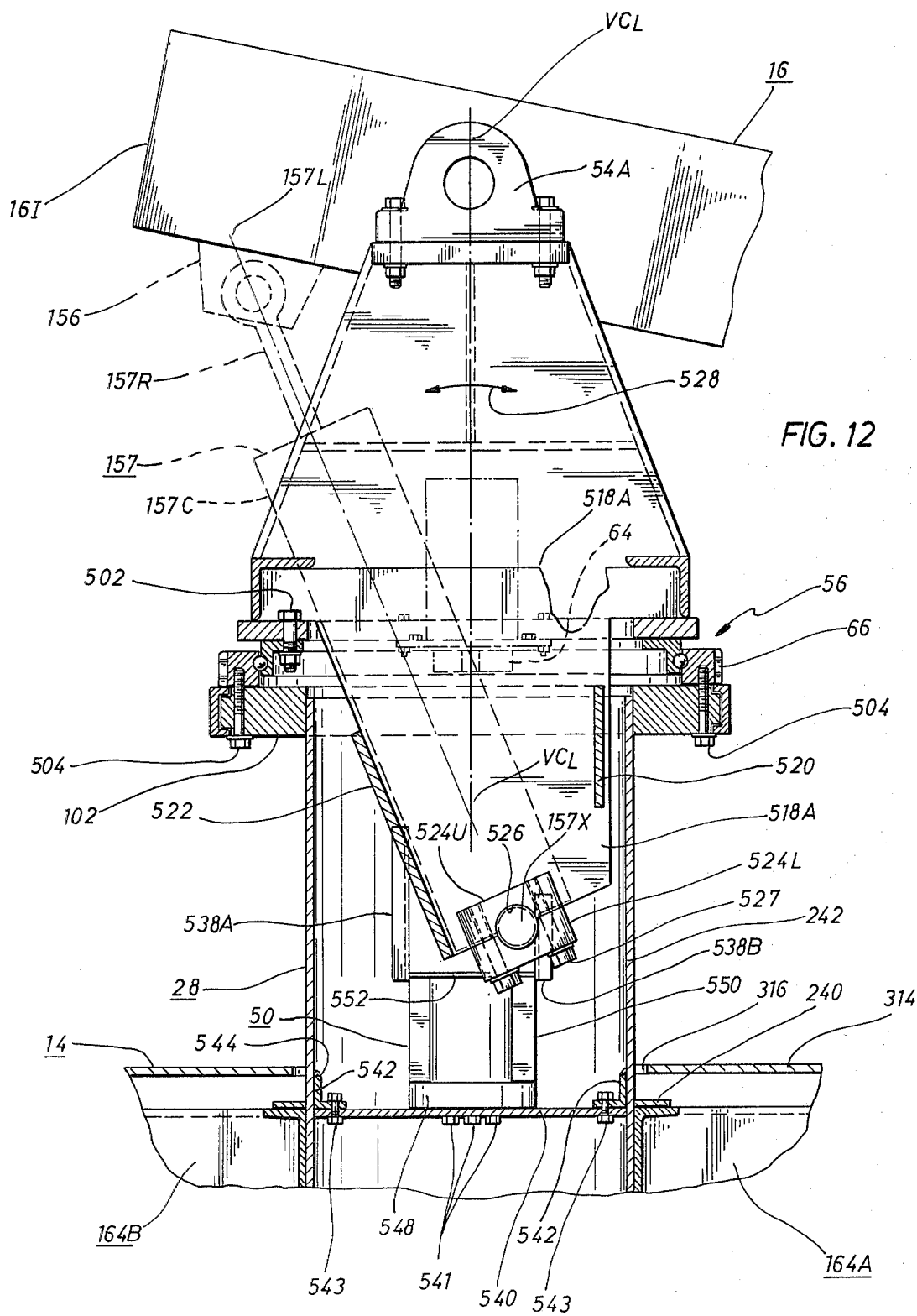
FIG. 12 is a view taken along section lines 12—12 in FIG. 11 showing a side sectional view of the hydraulic ram support shown in FIG. 11.

The telescoping member 118A extends axially rearwardly of the collar 120 such that the inner end 16I of the boom 16 is disposed over the access aperture 48. A pair of ears 156 (one of which 156B is seen in FIG. 12), each having an opening therein depend from the lower surface of the outer telescoping member 118A at the inner end 16I of the boom 16. The ears 156 receive a dowel pin 156D which pivotally connects the inner end of the boom 16I to the upper end of the rod of the piston 157P of a ram 157. The ram 157 is itself pivotally mounted at its lower end with the central post 28. Suitable for use as that hydraulic ram 157 is that manufactured by Shaeffer Corp. and sold under model number 4HHTR 16 CRK. A more detailed view of the mounting of the ram 157 is shown in FIG. 12.

Witht the piston 157P of the ram 157 pivotally connected to the inner end 16I of the loading boom 16 and the lower end of the ram 157 pivotally mounted to the deck 26, extension and retraction of the piston 157P of the ram 157 effects the upward and downward vertical pivotal movement of the loading boom 16 indicated by the reference arrows 158U and 158D, respectively. Simultaneously, the ram 157 is permitted to "rock" forwardly and rearwardly with the post 28 to permit the pivotal movement of the boom 16 to occur.

Figure 3B:
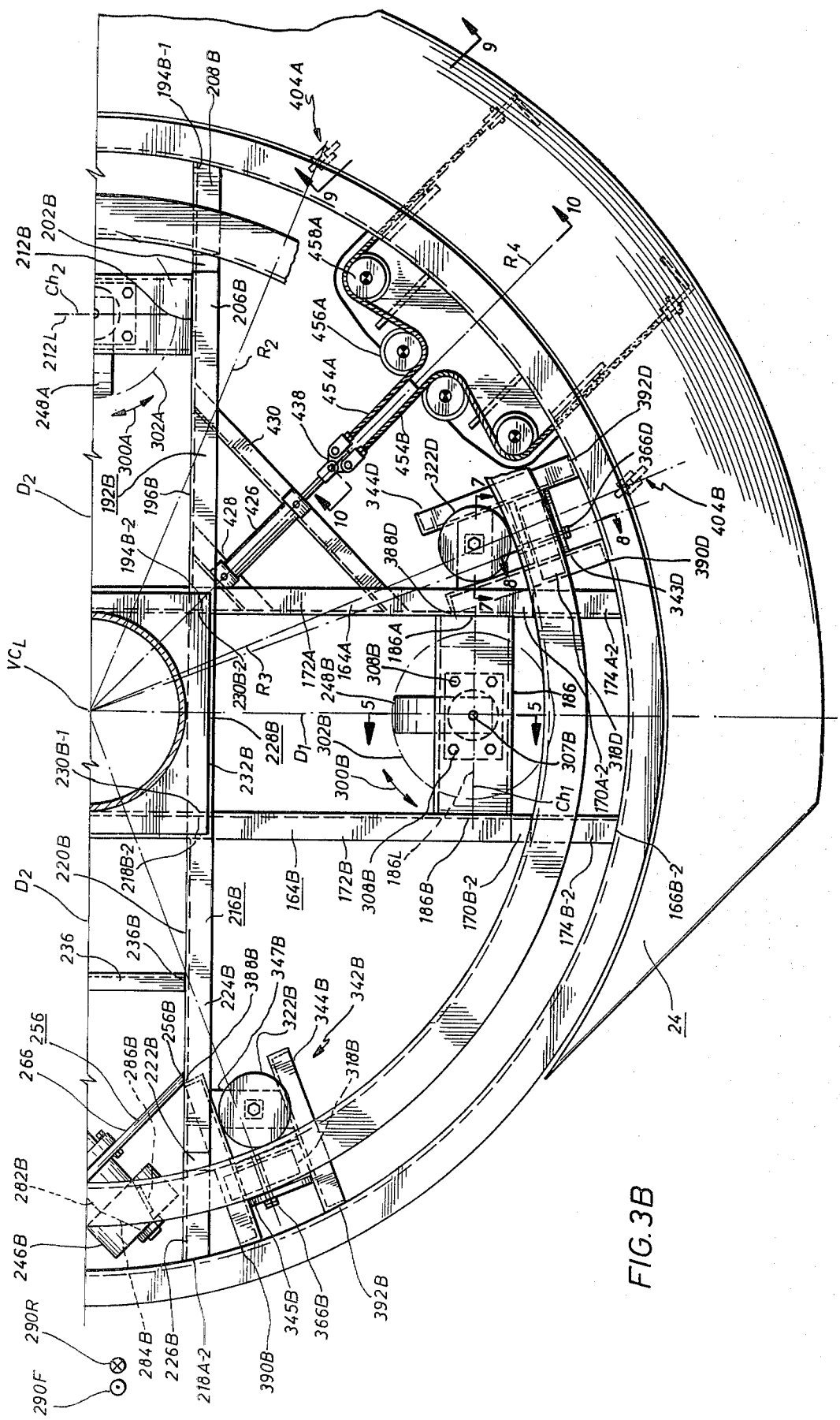
Figure 4:
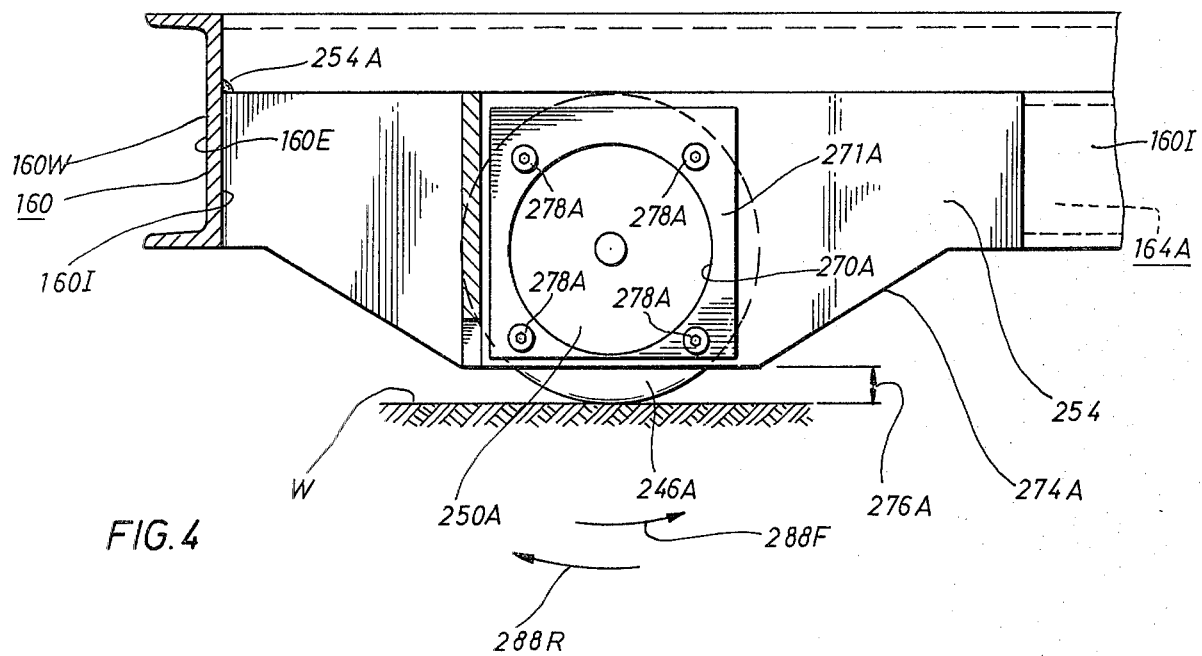
FIG. 4 is a view taken along section lines 4—4 of FIG. 3 showing a side view of the mounting arrangement of an apparatus drive wheel for a material handling apparatus in accordance with the instant invention.

From the foregoing description it should be realized that the apparatus 10 and various components thereof are movable in various ranges of motion. Of course, since the apparatus 10 is a totally self-contained material handling vehicle, it is freely displaceable in any direction over a work area and movable into and out of a cargo carrier (as a boxcar) by selective or concurrent energization of the drive wheel motors 250A and 250B (FIGS. 3 and 4).

The material conveyance surface 14 is, as noted above, mounted for rotary motion in an angular direction 20 with respect to the chassis 12. As also noted above, the axis of rotation 22 of the material conveyance surface 14 is preferably, but not necessarily, coincident with the vertical centerline VCL of the apparatus 10. The rotary motion of the material conveyance surface 14, which may be continuous or intermittent, is independent of the loading of material onto the conveyance surface. Control of the motion of the surface 14 is exercised by selective energization of the drive motor 334 therefor (FIG. 3).

The loading boom 16 is, in general, pivotally movable about a vertical reference axis extending from the chassis 12 to any angular position in a horizontal plane (i.e., a plane perpendicular to the reference axis). The vertical reference axis is preferably the central vertical axis VCL of the apparatus 10. In the preferred embodiment of the invention shown in FIGS. 1 and 2, this pivotal motion of the loading boom is imparted thereto by the rotation of the deck 26 on which the boom 16 is mounted in the directions 58R and 58L. The motion of the deck is controlled by energization of the motor 60.

The loading boom 16 is, also in the general case, pivotally movable about a horizontal axis extending from the chassis 12 in a vertical reference plane (i.e., a plane parallel to the plane of FIG. 1). The vertical reference plane preferably contains the central vertical axis VCL of the apparatus 10. In the preferred embodiment of the invention shown in FIGS. 1 and 2, this pivotal motion of the loading boom 16 is shown by the reference arrows 158U and 158D and is imparted thereto by the energization of the ram 157.

The loading boom 16 is also extensible and retractable along its axis in the directions 132E and 132R by energization of the ram 128. Furthermore, in the particular embodiment shown in FIGS. 1 and 2, the scoop 18 is angularly rotatable in the directions of arrows 144L and 144R about the axis of the loading boom 16 by the energization of the motor 134. The scoop 18 is also pivotally movable in the direction of the arrows 152E and 152R by the energization of the ram 146.

Any or all of the above motions of the apparatus 10, the boom 16 and the scoop 18 may be effected individually or simultaneously.

Referring to FIG. 3, a detailed plan view of the chassis 12 for the materials handling apparatus 10 of the instant invention is shown. The chassis 12, as noted above, provides the structural framework of the apparatus and includes as its basic structural member an outer frame member 160. The outer frame 160 is a generally annular member formed by tack welding, or otherwise suitably joining the ends of a rail of relatively substantial structural material, as MC6×16.3 steel. The radially inner surface 160I of the outer frame 160 defines a substantially vertically extending mounting face for a purpose discussed herein. In practice, it has been observed that the frame 160 is most easily formed into its circular configuration by first forming the frame in a plate mill. Final adjustments to the shape of the frame are accomplished by bending the rail around an array of upstanding posts or pegs secured in a circular configuration on the top surface of a forming table.

Figure 5:
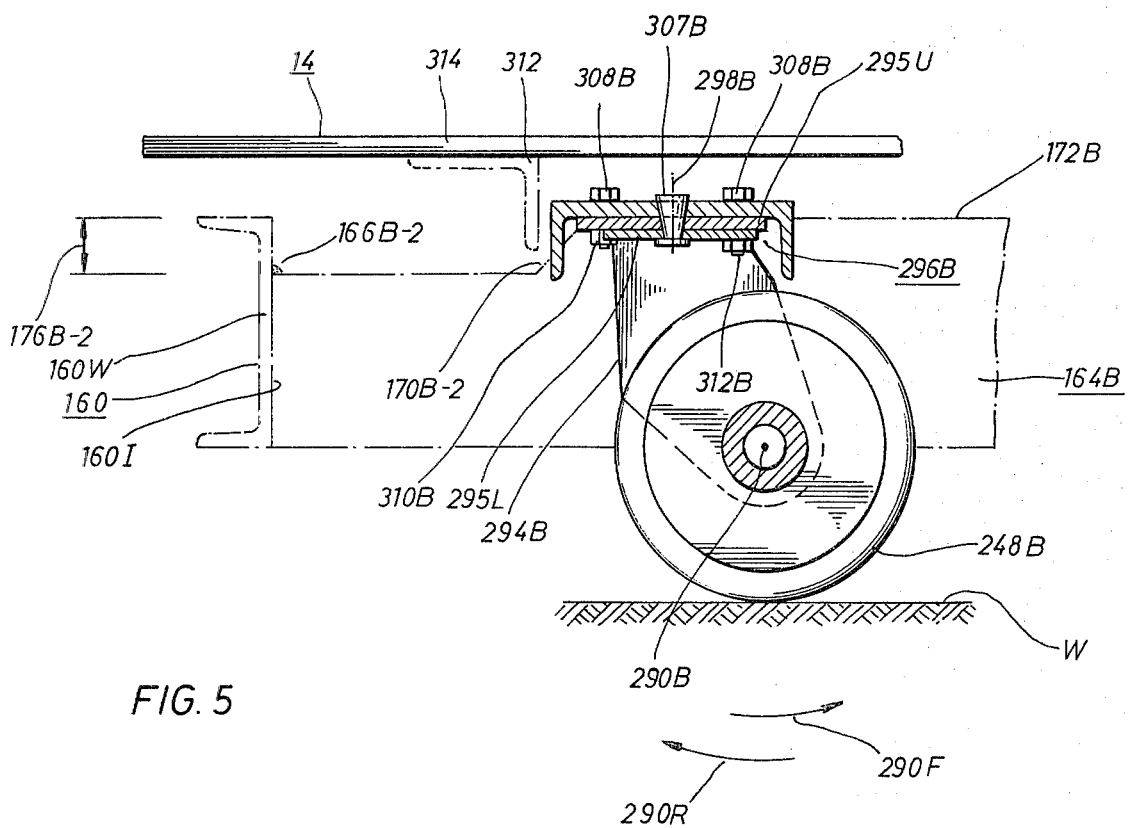
FIG. 5 is a view taken along section lines 5—5 of FIG. 3 showing the mounting arrangement of an idler wheel for a material handling apparatus in accordance with the instant invention.
Figure 6:
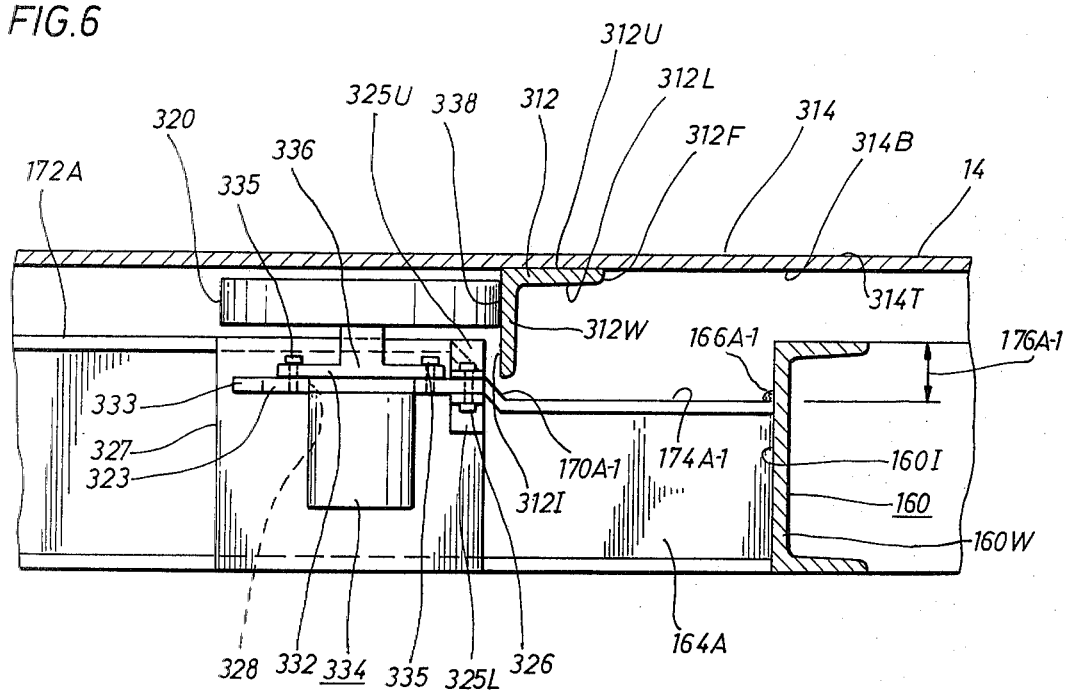
FIG. 6 is a view taken along section lines 6—6 of the mounting arrangement for a turntable drive wheel for material handling apparatus in accordance with the instant invention.
Figure 7:
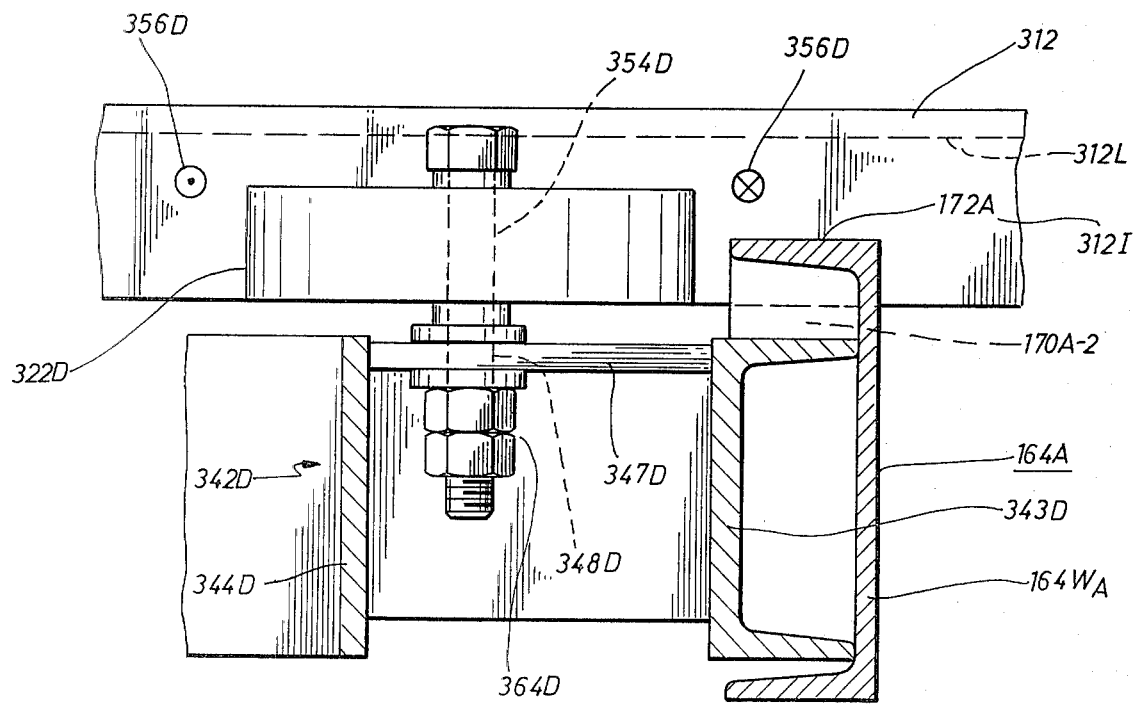
FIG. 7 is a view taken along section lines 7—7 in FIG. 3 showing the mounting arrangement for a turntable guide wheel for a material handling apparatus in accordance with the instant invention.

The outer frame 160 is braced by a first pair of struts 164A and 164B extending along a chord of the circular outer frame 160 substantially parallel to a diameter $D_1$ of the frame. The struts 164 are suitably attached, as by welding, to the mounting surface 160I, the points of attachment for the struts 164A and 164B being illustrated by reference characters 166A and 166B, respectively. The struts 164 may conveniently take the form of C-shaped channels which when mounted, present the exterior surfaces 168 on the backside of the webs 164W of the channel to one another. The ends of each strut 164, in the vicinity of the points of attachment 166 with the outer frame 160, have an inclined surface 170 thereon, the upper and lower edges of the inclined surface 170 being respectively defined by upper and lower portions 172 and 174 of the top surfaces of the C-shaped struts 164. As best seen in FIG. 5 the surfaces 172 and 174 are separated by a vertical spacing 176 provided to provide a clearance space for a purpose discussed herein.

The struts 164 are braced in the vicinity of their first points of attachment (166A-1 and 166B-1) and approximately one-fourth their length by an angle beam 180, the ends of the angle beam 180 being joined at its ends 182A and 182B by welding or other suitable means to the confronting faces 168A and 168B on the respective struts 164A and 164B. In the vicinity of their second points of attachment (166A-2 and 166B-2), at a point next-radially inwardly adjacent to the upper edges of the inclined surfaces 170A and 170B, the struts 164 are braced by a channel beam 186. The beam 186 is mounted at its end to the confronting surfaces 168 of the struts 164 such that the axis 186L of the beam is coincident with a chord $Ch_1$ of the outer frame 160.

A second pair of struts 192A and 192B, each approximately one-half the length of the struts 164, are mounted between the inner surface 160I of the outer frame 160 (at points 194A-1 and 194B-1, respectively) and the web 164W of the first strut 164A (at points 194A-2 and 194B-2, respectively). The struts 192 are substantially C-shaped channel beams with the back surfaces 196A and 196B of the webs thereof confronting each other. The struts 192 extend along chords of the outer frame 160 in parallel to a diameter $D_2$ of the outer frame 160. The diameter $D_2$ is conveniently, but not necessarily, perpendicular to the diameter $D_1$.

The ends of each strut 192, in the vicinity of their points of attachment 194 with the frame 160, have an inclined surface 202 thereon, the upper and lower edges of the inclined surfaces 202 being defined by upper and lower portions 206 and 208, respectively, of the top surfaces of the struts 192. The surfaces 206 and 208, in a manner similar to the surfaces 172 and 174, are vertically spaced one from the other to define a predetermined clearance. The struts 92 are braced at points next-radially inwardly adjacent to the upper ends of the inclined surfaces 202A and 202B by a channel beam 212. The beam 212 is mounted at its end to the confronting faces 196 of the struts 192. Similar to the beam 186, the beam 212 is arranged so that the axis 212L thereof is coincident with a chord $Ch_2$ of the outer frame 160. Preferably, the chord $Ch_2$ is equal to the chord $Ch_1$.

A third pair of struts 216A and 216B, equal in length to the struts 192, are mounted to the inner surface 160I of the outer frame 160 at respective points 218A-1 and 218B-1. The points 218 lie on opposite ends of the chords which intersect the frame 160 at the points 194A-1 and 194B-1, respectively. The second ends of the struts 216 are joined to the web 164W of the second strut 164B at points 218A-2 and 218B-2, respectively. The struts 212, like the struts 164 and 192, are substantially C-shaped channels, the back surfaces 220 of which confront each other. The struts 216 are provided with inclined surfaces 222 thereon, the upper and lower edges of which being respectively defined by upper and lower portions 224 and 226 of the top surfaces of the struts 216. The surfaces 224 and 226 are vertically spaced a clearance distance apart.

Short channel struts 228 are disposed between the ends of the struts 192 and 216. The ends 230 of the struts 228 are joined to the webs 164W of the channels 164 at points thereon opposite the points of attachment 194 and 218. The channel struts 228 define upper surfaces 232 thereon.

For a purpose to be made clear herein, the upper surfaces 196 (of the struts 192), the upper surfaces 224 (of the struts 216) and the upper surfaces 232 (of the struts 228) are coplanar with each other and with the upper surfaces 172 (of the struts 164). These coplanar surfaces cooperate to define a planar support shelf which rectangularly bounds the vicinity of the center of the outer frame 160.

The struts 216 are braced at a point substantially equidistant their ends by an angle beam 236. The ends 236A and 236B of the angle beam 236 are joined, as by welding or other suitable means, to the confronting faces 220 of the struts 216.

A flat, square support plate 240 is overlaid and secured as by welding, on the cooperating upper surfaces 172, 206, 224 and 232 of the struts 164, 192, 216 and 228, respectively. The main structural member of the central post 28 of the apparatus 10 is defined by an upstanding tubular member 242, secured to the plate 240 such that the center of the tube 242 is coincident with the center of the outer frame 160. (See also, FIG. 12).

The drive means for the apparatus 10 is mounted to the chassis 12 and includes two drive wheels 246A and 246B (disposed adjacent the rear of the chassis 12), and two idler wheels, or casters 248A and 248B (disposed adjacent the front of the chassis 12).

The drive wheels 246A and 246B and hydraulic motor drives 250A and 250B therefor are respectively mounted on drive support plates 254 and 256. The drive support plate 254 (preferably a three-fourth inch flat bar) is disposed with its first end 254A secured (as by welding) to the mounting surface 160I of the outer frame 160. The other end 254B of the drive support plate 254 is also secured, as by welding, to the face 168A of the strut 164A. One side 258 of the plate 254 is presented toward the surface 168B of the strut 164B. A shim, or brace, 260 extends between the surfaces 258 and 168B in order to further support the drive wheel 246A.

In substantially like fashion, the plate (also a three-fourth inch flat bar) which defines the drive wheel support 256 is mounted at its first end 256A to the mounting surface 160I of the outer frame 160, with the second end 256B of the plate 256 being secured to the face 220B of the strut 216B. A shim 264 is secured between the face 220A of the strut 216A and one side 266 of the drive support plate 256.

The drive support plates 254 and 256 are arranged such that the sides 258 and 266 respectively lie substantially parallel to each other. The surfaces 258 and 266 are each equidistant at all points therealong from a radius $R_1$ bisecting the right angle between the diameters $D_1$ and $D_2$. That is, the radius $R_1$ lies at forty-five degrees to the diameter lines $D_1$ and $D_2$, and thus extends substantially rearwardly of the apparatus 10. The arrangement of the wheel support plates 254 and 256 in the described relationship facilitates turning movement of the apparatus 10 by selective energization of either or both drive motors 250A or 250B for the respective drive wheels 246A or 246B.

It has been found that it is the desired practice when fabricating the drive wheel support plates 254 and 256 and the shims 260 and 266 respectively associated therewith to utilize a jig which holds the plate and its associated shim in their assembled relationship (as seen in FIG. 3). These members may then be expeditiously welded or otherwise secured to each other.

The manner in which the drive wheels 246 and the hydraulic motor drives 250 therefor are mounted onto the drive support plates 254 and 256 may be more fully understood by reference to FIG. 3 and to the enlarged sectional view of the details of the mounting of the drive wheel 246A and motor 250A therefor shown in FIG. 4. (Corresponding elements which effect the mounting of the drive wheel 246B and its associated hydraulic motor 250B on the plate 256 are indicated by corresponding numerals with "B" suffixes on FIG. 3.)

As seen in FIG. 4 the drive support plate 254 has an opening 270A therein sized to received a hydraulic drive motor 250A (shown in plan in FIG. 3), such as that sold by Char-Lynn under model number 2000 Series, 105-1077. (An identical motor is used for the drive wheel 246B.) The mounting flange 271A of the motor 250A is provided with an array of bolt holes which register with an array of openings provided in the plate 254. (The plate 254 is enlarged vertically, as at 274, in order to define the lower bolt openings.) The vertical enlargement is squared at its lower end so as to define a ground clearance 276. Bolts 278 and nuts 280 (FIG. 3) secure the motor 250A to the plate 254. The body 282A (FIG. 3) of the motor 250A projects through the opening 270A in the plate 254, with the rotor 284A of the motor 250A being keyed (as at 286A) to the drive wheel 246A. As seen in FIG. 4, each drive wheel is rotatable in either the forward or reverse directions as shown by the arrows 288F and 288R (for the wheel 246A) and arrows 290F and 290R (for the wheel 246B).

It should again be noted that although the preferred embodiment of the invention is a wheeled vehicle having drive wheels 246 driven by hydraulic motors 250, any suitable means for moving the apparatus 10, such as rail and wheel, tracks or treads may be utilized and remain within the contemplation of the invention. The hydraulic fluid connections for the drive motors 250 for the drive wheels 246 are set forth in connection with FIG. 18.

The idler wheels 248A and 248B are respectively connected to the beams 186 and 212. The mounting details of one of the idler wheels 248B may be seen in FIG. 3 taken in connection with FIG. 5. (Corresponding mounting details for the other idler wheel 248A are shown in FIG. 3 with corresponding reference numerals and the suffix "A").

The idler caster wheel 248B rolls about its mounting axis 290B in either forward or reverse direction as shown by arrows 292F or 292R. The wheel 248B depends from an arm 294B from the lower race 295L of a bearing 296B. The lower race 295L is free to rotate about the axis 298B of the bearing (in the direction of arrow 300B in FIG. 3) so that the idler wheel 248B is able to freely occupy any angular position within the three hundred-sixty degree arc 302B in a plane surounding the axis 298B. The lower bearing race 295L is rotatably secured to the upper race 295U by a central pin 307B, with the upper race 295U secured to the channel 186 (or 212, for the idler wheel 248A) by an array of bolts 308B and nuts 310B.

The material conveyance surface 14 may be defined by any suitable surface which is adapted to convey material loaded thereonto (typically from the front of the apparatus 10) by the operation of the loading boom 16 and scoop 18 to a position where the material is deflected therefrom by the action of the deflector conveyor 68 onto the carry-off conveyor 88. The material conveyance surface 14 may, in the general case, be conical, planar or scooped. The surface 14 may be inclined forwardly, rearwardly or sidewardly with respect to the chasis 12, but may also or either be mounted for vibratory motion therewith. Any suitable combination of structure and mode of action whereby material loaded onto the surface 14 is conveyed into a position where it may be deflected therefrom by the deflector conveyor 68 lies within the contemplation of this invention.

However, as set forth in the drawings, the preferred form of the material conveyance surface 14 is planar, and it is preferable to mount the surface 14 for rotation in a horizontal plane measured from the chassis 12. (Thus, when the chassis 12 is on a horizontal work surface, the surface 14 rotates in a plane parallel to the plane of FIG. 2). Accordingly, hereinafter, the material conveyance surface will be referred to as the "rotary turntable" or "turntable", with the reference character 14 being assigned thereto.

The turntable 14, which is supported for rotary movement upon the chassis 12, is formed of an angle beam 312 configured in an annulus by tack welding or otherwise suitably joining the ends thereof, overlaid by a plate 314. The beam 312 may be initially formed by a plate mill, with final adjustments made with the use of a pegged table similar to that discussed in connection with the frame 160. The plate 314 is provided with a circular cutout 316 adapted to fit around the central tube 242 which projects therethrough. The top surface 314T of the plate 314 provides the working surface for the material handling apparatus 10 of the instant invention and is selected from materials which exhibit as flat and smooth a top surface as is commercially available from stock. It has been found that a smooth, slick surface for the turntable 14 is preferred, inasmuch as this prevents bagged or sacked material from being "grabbed" or adhering to the surface of the turntable 14 when the deflector conveyor 68 is attempting to deflect the material from the turntable 14.

The bottom surface 314B of the plate 314 is secured in any convenient manner to the upper surface 312U of the flange 312F of the beam 312. The lower surface 312L of the flange 312F serves as the surface by which the turntable 14 is supported for movement with respect to the chassis 12 on support wheels 318 (FIG. 8) mounted on the chassis 12 for that purpose. The inside surface 312I of the web 312W of the beam 312 is engaged against by both a turntable drive wheel 320 (FIG. 6) and guide wheels 322 (FIG. 7) of the apparatus so that guided rotary motion may be imparted to the turntable 14.

As seen in FIG. 3, the turntable drive wheel 320 is mounted to the chassis at any convenient location thereon, as in the vicinity of one of the apparatus drive wheel 246A for simplicity of hydraulic fluid interconnections. As seen in the FIGS. 3 and 6, a mounting bracket plate 323 is pivotally secured at one corner thereof between two angle beams 325U and 325L by a dowel 326. The angle beams are secured to a stiffener plate 327. The plate 327 is welded or otherwise suitably attached to the edges of the upper and lower flanges of the strut 164A in the vicinity of the inclined surface 170A-1 thereon. The height difference defined between the top and bottom edges of the inclined surface 170A permits the struts 164 (and 216) to pass beneath the beam 312. The bracket 323 has a cutout 328 therein which receives and supports the flange 332 of a hydraulic drive motor 334. The motor 334 is bolted to the plate 323 by bolts 335. Suitable for use as the drive motor 334 is a motor manufactured by Char-Lynn and sold under model number 2000 Series, 104-1001. The body 336 of the motor 334 extends vertically upwardly and is keyed to the turntable drive wheel 320. The drive wheel 320 is engaged in frictional contact (as at 338) with the inner surface 312I of the beam 312. Application of pressurized hydraulic fluid to the motor 334 rotates the wheel 320 in the direction of the arrow 340. Due to the frictional engagement between the drive wheel 320 and the surface 312I, the turntable 14 is dragged into rotational movement in the direction 20. The hydraulic fluid connections for the motor 334 are discussed in connection with the hydraulic diagram of FIG. 18.

In order to accommodate any irregularities in the circularity of the beam 312, the drive wheel 312 is biased into contact therewith (on the surface 312I) by a spring 341. The spring is disposed between an arm 333 formed on the bracket 323 (diagonally from its pivotal mounting) and the inside surface 160I of the frame 160.

The spring imposes a force in the direction 339 on the bracket 323 to urge the drive wheel 320 into contact with the beam 312I.

The support wheels 318 and the guide wheels 322 for the turntable 314 are disposed on the chassis 12 at equiangular locations thereon. Since the mounting arrangements for each support wheel 318 and each guide wheel 322 are identical, only the mounting details of the support wheel 318D/guide wheel 322D are described in detail in connection with FIGS. 3, 7 and 8.

Initially, a support wheel/guide wheel package is prepared using a suitable jig to hold the members in position to expedite the connections therebetween, as by welding. The support wheel/guide wheel package, generally indicated by the reference numeral 342D, includes a pair of opposed channels 343D and 344D. The channels 343D and 344D are braced by a pair of plates 345D and 346D welded between the confronting back surfaces of the channels. The channels 343D and 344D are further braced by a flat plate 347D (having an opening 348D therein) also disposed along its edges between the confronting back surfaces of the channels. As is seen from the Figures, the plates 345D and 346D serve to mount the support wheel 318D, while the plate 347D mounts the guide wheel 322D.

The guide wheel 322D is rotatable about a central shaft 354D in the direction of the arrow 356D and abuts, as at 358D with the surface 312I of the beam 312 to guide the rotary motion of the turntable 14. The shaft 354D extends through the opening 348D in the plate 347D and is retained in the described assembled relationship by the threading of a lock nut and washer arrangement 364D.

The support wheel 318D is mounted for rotational movement in the direction of arrow 366D (in a plane perpendicular to the plane of FIG. 3) on a central axle 368D having a head 370D thereon. The axle 368D is supported at each end thereof by interior washers 376D, 378D and exterior washers 380D, 382D as the axle 368D is secured, as by threaded nuts 384D, within suitable openings provided in the trunnions defined by confronting plates 345D and 346D.

Once a support wheel/guide wheel package is constructed in accordance with the defined assembled relationship, the package may be secured at an appropriate location on the chassis 12. Since it is imperative that the axis of rotation of the axle 368D lies on a radius of the frame 160, the package is located on the frame so that this orientation of the axle 368D is defined. The channels 343D and 344D are then welded or otherwise attached to the struts and the frame. In connection with the package 342D, the channel 343D is welded at one end to the web of the strut 164A (illustrated by the attachment 388D) and at the other end to the frame 160I (as illustrated by the attachment 390D). One end of the channel 344D is attached (as at attachment 392D) to the frame 160 at a location angularly spaced from the attachment 390D. In this manner the desired orientation of the support wheel axle 368D and the abutment of the guide wheel 322D to the turntable channel 312 (on the surface 312I) may be expeditiously effected.

Figure 9:
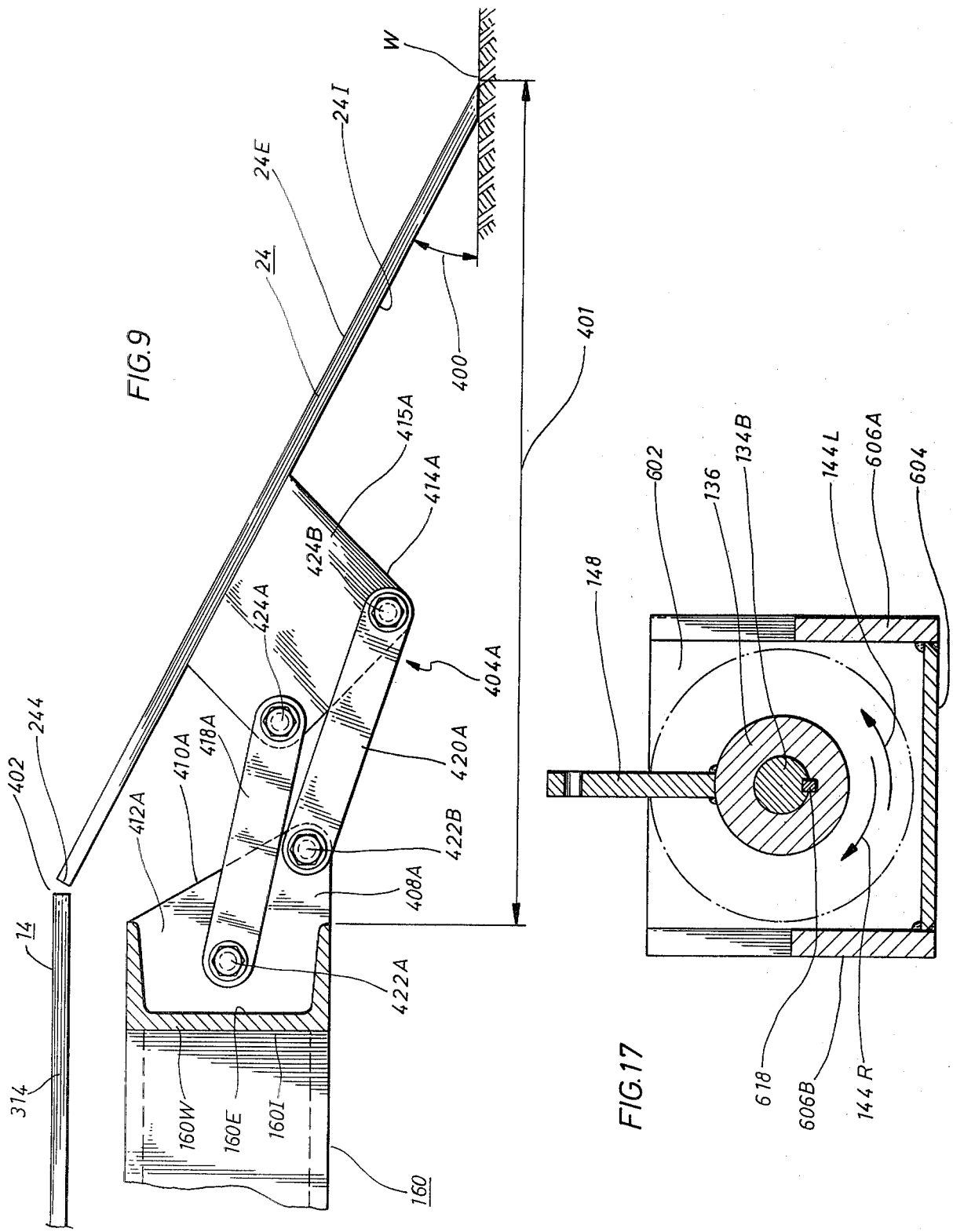
FIG. 9 is a view taken along section lines 9—9 of FIG. 3 showing a skirt pivot arrangement for a material handling apparatus in accordance with the instant invention.

The skirt 24 is formed of a suitable planar material, as a three-eighth inch plate, with the exterior surface 24E thereof being substantially frustoconical in configuration. The interior undersurface 24I, also frustoconical in configuration, preferably defines an angle 400 of thirty degrees with the horizontal workfloor W (FIG. 9). The upper edge 24U of the skirt 24 lies within a close clearance 402 of the turntable 14, the clearance 402 being sufficient to permit the skirt 24 to be lifted without interference from the turntable 14.

As just mentioned, the skirt 24 is adapted to be raised and lowered above the workfloor W. To permit the raising and lowering of the skirt to occur, a pair of pivoting arrangements 404 are attached to the interior surface 24I of the skirt 24. As seen with reference to FIG. 3, the pivoting arrangements 404 are located in the vicinity of the intersection of radii $R_2$ and $R_3$ and the upper edges 24U of the skirt 24. The radii $R_2$ and $R_3$ emanate from the center VCL of the apparatus, with each radius defining an equal angle (approximately $22\frac{1}{2}$ degrees) from a radius $R_4$. The radius $R_4$ is 180° opposed from the radius $R_1$, the radius $R_4$ effectively extending toward the front of the apparatus 10. The radii $R_3$ and $R_4$ subtend an angle of forty-five degrees.

Referring to FIG. 9, a side elevation view of pivoting arrangement 404A is shown, corresponding elements of the other pivoting arrangement 404B being shown in FIG. 3 with corresponding numerals followed by the suffix "B".

The pivoting arrangment 404A includes a forwardly extending pivot plate 408A mounted to the exterior surface 160E of the web 160W of the frame 160. The plate 408A is provided with an inclined edge 410A tapering forwardly toward the skirt 24. The pivot plate 408A is mounted to the frame 160 so that the sides 412A thereof are parallel to the central vertical plane of the apparatus (the plane containing the central vertical axis VCL and the radius $R_4$).

A second pivot plate 414A is secured to the interior undersurface 24I of the skirt 24. The sides 415A of the plate 414A are parallel to the sides 412A of the plate 408A, with the plate 414A being directly in front of the plate 408A. The plates 408A and 414A are connected by a pair of lift arms 418A and 420A, each arm in each pair being abutted against opposite sides of the plates 408A and 414A. The arms 418 are secured at their first ends to the plate 408A by a bolt 422A at their second ends to the plate 414 by a bolt 424A. The arms 420 are secured at their first and second ends to the plates 408A and 414A by bolts 422B and 424B, respectively.

Figure 10:
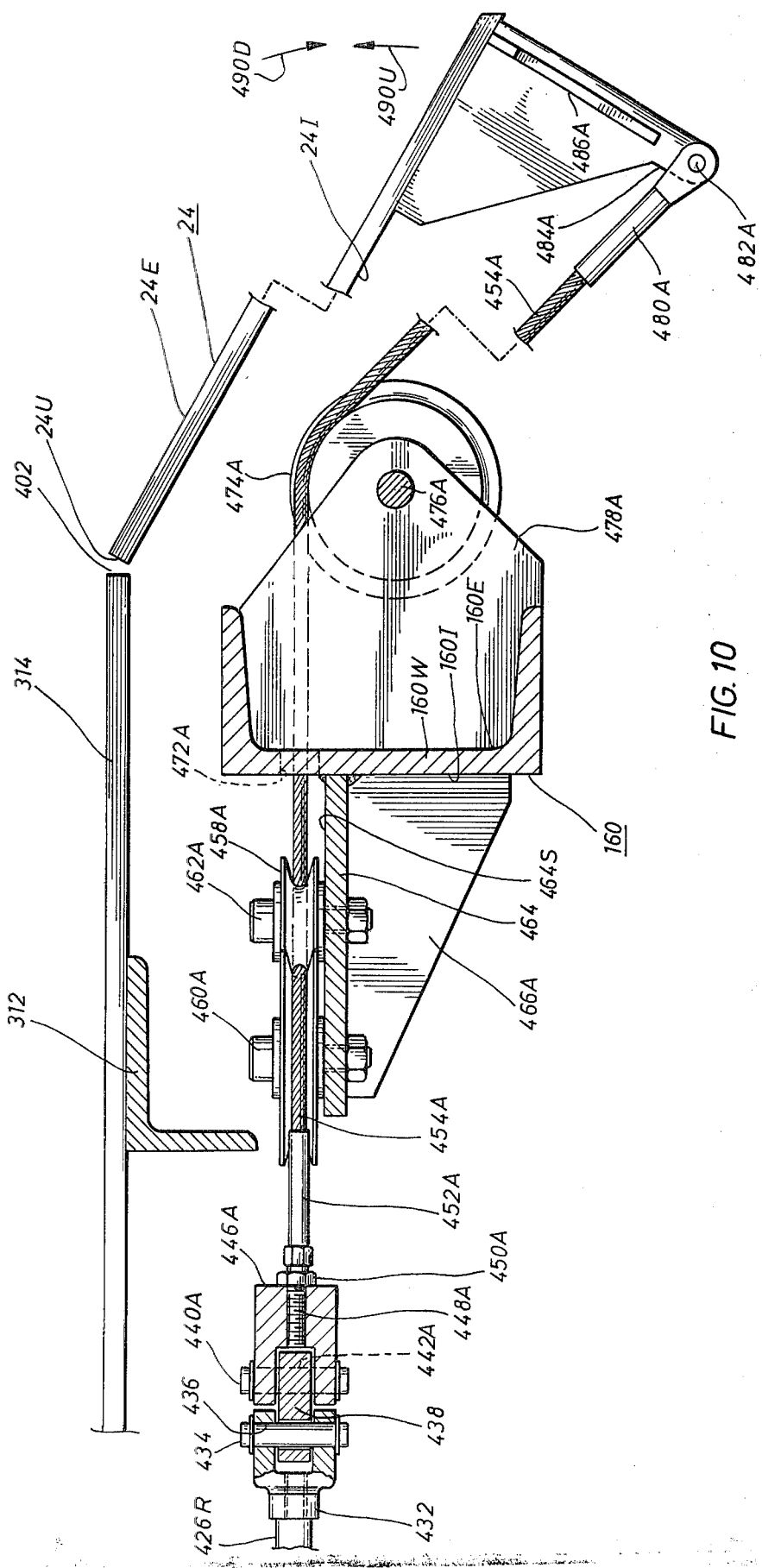
FIG. 10 is a view taken along section lines 10—10 of FIG. 3 showing the skirt lift arrangement for a material handling apparatus in accordance with the instant invention.

Referring to FIGS. 3 and 10, the skirt lifting arrangement is seen to include a hydraulic ram 426 (supplied by fluid connections 728, FIG. 18) secured at its radially inner and outer ends 426I and 426O by brackets 428 and 430. The brackets 428 and 430 are connected between struts 164A and 192B (FIG. 3). The ram 426 is mounted such that its piston rod 426R is reciprocable along the radius $R_4$.

As seen best in FIG. 10, the rod 426R of the ram 426 is threaded into a clevis 432. The clevis 432 is secured by a dowel 434 to the apex bore 436 of a triangular linking plate 438. Dowels 440A and 440B extend through bores 442A and 442B provided in the corners of the plate 438 to link the plate 438 to a pair of clevises 446A and 446B. Threaded to the shank of each clevis 446 by bolts 448A and 448B, respectively, and secured thereto by lock nuts 450A and 450B, are cable fittings 452A and 452B. Suitable for use as the fittings 452 are stud end cable fittings, such as those manufactured by Carolina Steel and Wire Corp. and sold under model number MS-21259.

Connected to each cable fitting 452 is a three-sixteenth inch wire cable 454A and 454B. Each cable winds around first and second pairs of pulleys 456 and 458, respectively. Each pulley in the pair 456 is rotatably supported on axles 460A and 460B, while each pulley in the pair 458 is rotatably supported on axles 462A and 462B. All the axles 460 and 462 extend upwardly from a plate 464 welded to the inside surface 160I of the web 160W of the frame 160. The plate 464 is braced in a position such that its upper surface 464S is parallel to the turntable 14 by a gusset 466. The axles are secured by locknuts 468 and 470.

Each cable 454 extends through an aperture 472 provided in the frame 160. The cables pass over pulleys 474 supported on axles 476 mounted on plates 478 secured to the exterior surface 160E of the web 160W of the frame 160. The plates 478 are welded so as to extend perpendicularly to the turntable 14.

The lower end of the cables 454 are each secured to forked cable fittings 480, such as those sold by Carolina Steel and Wire Corp. under model number MS-20667. The clevis arms of the fittings 480 are pinned by dowels 482 to the lower ends of the plates 484 secured, as by welding, to the interior surface 24I of the skirt 24. The plates are braced in position by gussets 486.

To raise the skirt 24, pressurized fluid is supplied to the ram 426 which draws the piston rod 424R in the retracting direction shown by the arrow 490. As a result, tension forces are applied to the skirt 24 causing the lifting arms 418 and 420 (FIG. 9) to scissor, allowing the skirt 24 to pivot in the upward direction 490U (FIG. 10). Withdrawal of the pressurized fluid from the ram 426 permits the skirt 24 to fall under the influence of its own weight.

Figure 11:
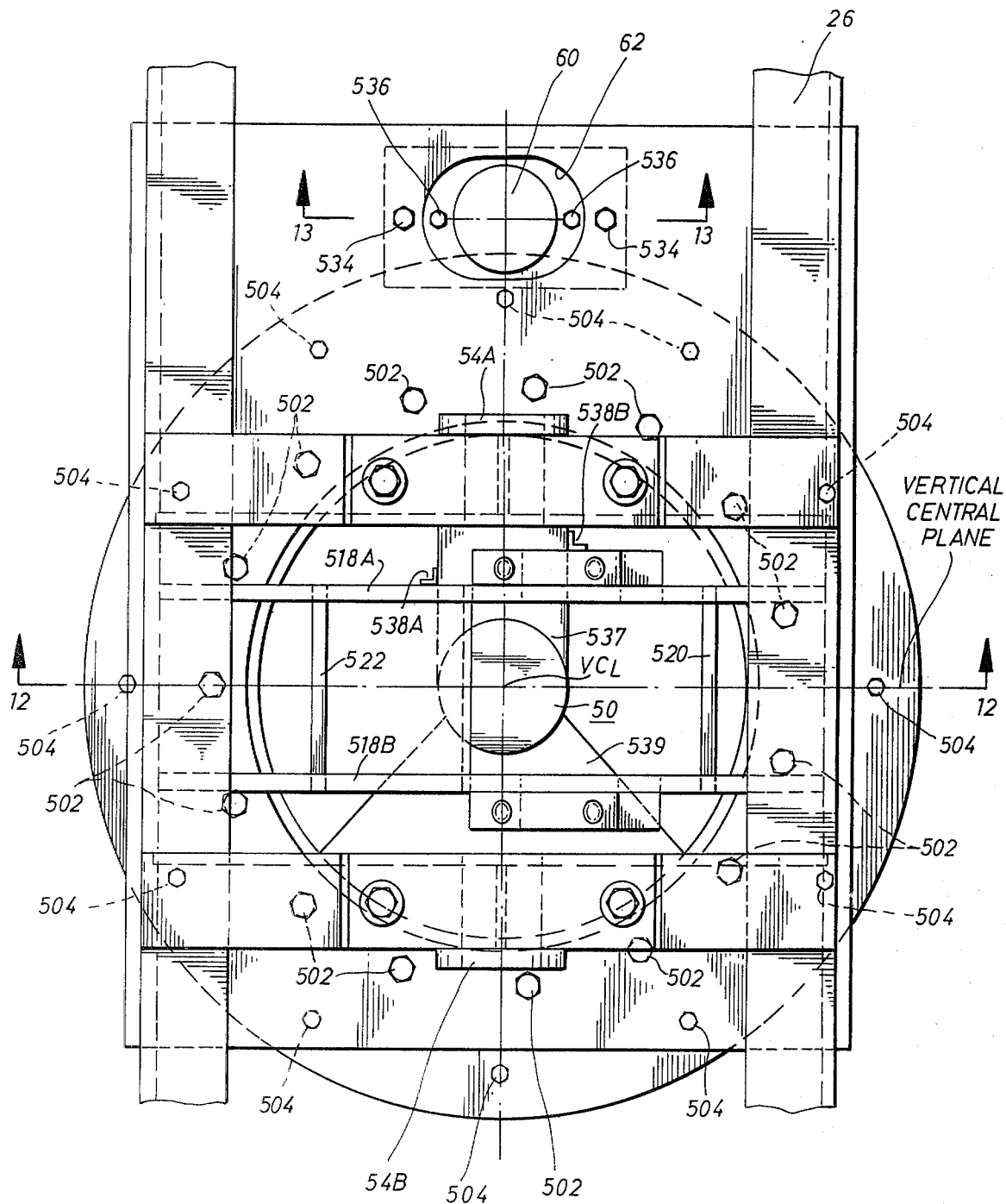
FIG. 11 is an enlarged plan view showing the mounting arrangement for a hydraulic ram used to generate pivotal motion of the loading boom of a material handling apparatus in accordance with the instant invention.

Referring to FIGS. 11 and 12, shown are enlarged views in plan and in section showing the mounting arrangement whereby the ram 157 is mounted within the interior of the central post 28.

Disposed in the undersurface of the operating deck 26 in the vicinity of the access aperture 48 is the bearing 56. Suitable for use as the bearing 56 is that device manufactured by Roteck Corp. and sold under model number 2100L6-22E9Z. The deck 26 is supported on the bearing 56 for rotation with respect to the central post 28. The bearing 56 also supports the downward (thrust) load of the deck 26. The bearing 56 is secured to the deck 26 by an array of bolts 502 which engage a flange 56F extending from the inner race of the bearing 56. The outer race of the bearing 56 is secured by bolts 504 to the collar 102 secured to the top of the tube 242. The rack 66 is provided on the exterior of the outer race of the bearing 56. (A matching pinion 64 is provided by Roteck Corp. under number P43.502.)

Vertically extending plates 518A and 518B are disposed between the trunnions 54 mounted on the deck 26 and depend downwardly into the interior of the central post 28. The surfaces of the plates 518 are substantially parallel to the central vertical plane of the apparatus 10.

A brace plate 520 is disposed between the plates 518. The surfaces of the brace plate 520 are perpendicular to the central vertical plane of the apparatus 10. A second brace 522 is disposed between the plates 518, with the surface of the plate 522 defining an inclined axis with respect to the central vertical axis of the apparatus. Mounted at the lower end of each of the plates 518, as by welding, is the upper half 524U of each of a pair of mounting brackets 524.

The mounting brackets 524 are formed of upper and lower halves 524U and 524L, respectively. The halves 524 each have a cutout portion which registers when the halves are joined to define openings 526. The arm 157 is inserted into the central post 28 from beneath the deck 26. The ram 157 has axles 157X extending radially (with respect to the axis 157L of the ram 157) from each side thereof. The axles 157X are received within the cutout portion of the upper halves 524U of the brackets 524. The lower halves 524L of the brackets 524 are then secured to the upper halves, as by bolts 527. The ram 157 is then pivotally secured within the post 28, and may "rock" forwardly and rearwardly in the direction of arrows 528 as the piston rod 157R of the ram is extended or retracted, to pivot the boom 16.

Figure 13:
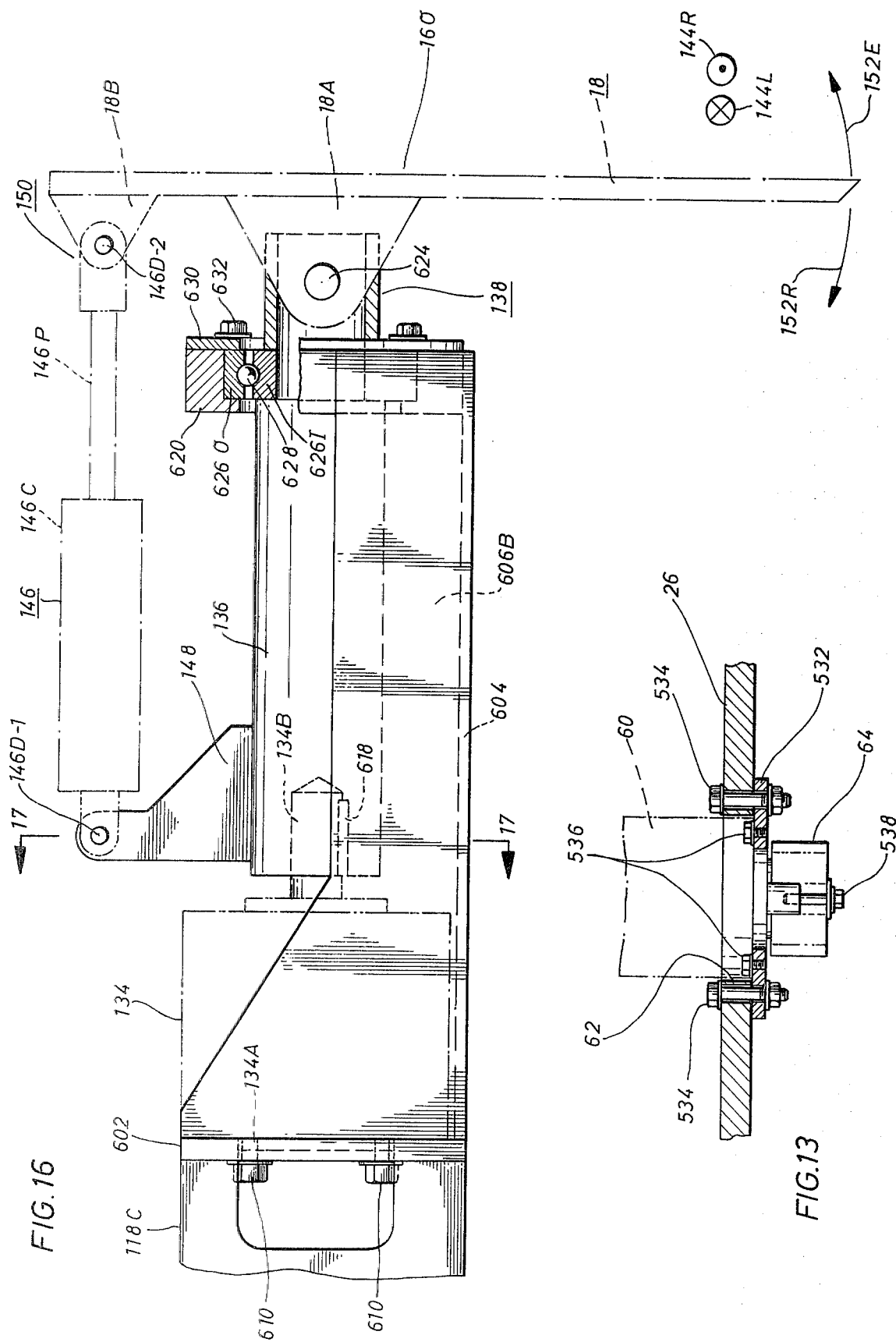
FIG. 13 is a view taken along section lines 13—13 in FIG. 11 showing the mounting of the hydraulic motor for rotating the operating deck of a material handling apparatus in accordance with the instant invention.

As best seen in FIGS. 11 and 13, the opening 62 in the deck is provided in the vicinity of the trunnion 54A. A support plate 532 is secured below the deck 26 in concentricity with the cutout 62 by an array of bolts 534. The portion of the support plate 532 disposed inwardly of the cutout 62 provided in the deck 26 services as a mounting shoulder which receives the motor 60. Bolts 536 secure the moutning flange of the motor 60 onto the support plate 532. The planatary gear 64 is bolted as by threaded bolt 538 to the downwardly projecting rotor of the motor 60.

The hydraulic swivel 50 is supported within the interior of the central post 28. As is discussed in more detail herein, the swivel 50 is formed of an outer sleeve 550 (FIGS. 14 and 15) which rotates with the deck 26 and an inner core 548 which remains "stationary" (with respect to the sleeve 550) due to its mounting to the chassis.

The sleeve is generally cylindrical member which has a flange plate 537 attached to the cover plate 552 thereof. The flange plate 537 is secured within the central post 28 by downwardly extending angle beams 538A and 538B which are connected to plate 518A. The cover plate 552 of the sleeve 550 is attached to a flared brace plate 539 which has an outer edge contoured to match the inside diameter of the tube 242 of the central post 28. The flared plate extends outwardly of the sleeve to abut the interior of the tube 242 to brace the sleeve 550 as the sleeve depends from the plate 518A.

The core 548 is secured to the chassis 12 by a plate 540 threaded to the core by an array of bolts 541. The ends of the plate 540 are themselves attached to mounting flanges 542 by bolts 543. The flanges 542 are welded, as at 544, to the interior of the tube 242.

Figure 14:
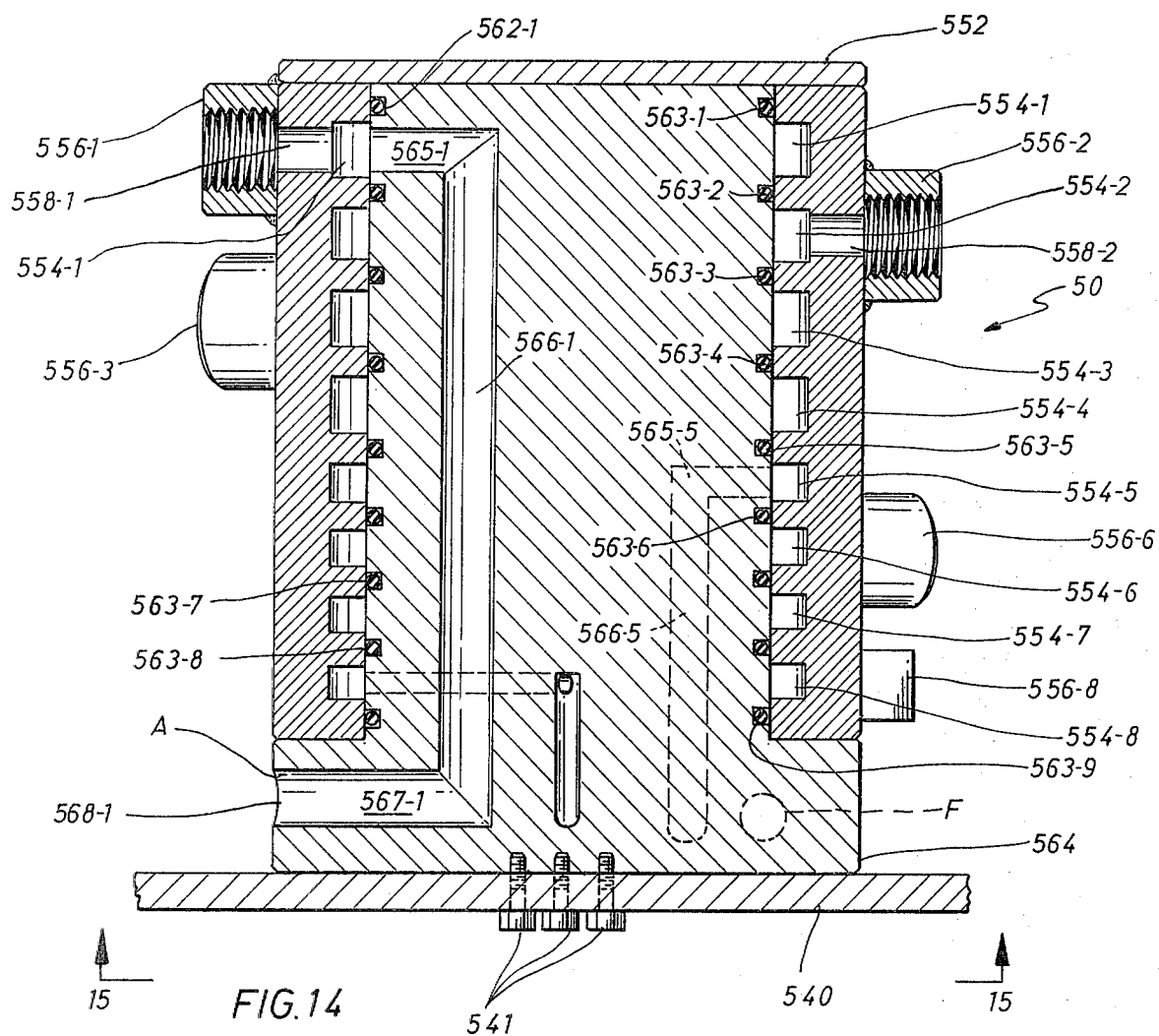
FIG. 14 is a side view, entirely in section, showing a hydraulic swivel for material handling apparatus in accordance with the instant invention.

As seen in FIG. 14, the sleeve 550, having the cover plate 552 thereon, is provided with a plurality of annular grooves 554 disposed about the interior surface thereof. Each of the grooves 554 communicates with sleeve nozzles 556 (some of which are shown in FIG. 14) secured to the exterior of the sleeve by radially extending ports 558 provided therein. As seen from the Figures, the grooves 554 are fomed one above the other along the interior of the sleeve 550 with the sleeve nozzles 556 being oriented along differing radii of the sleeve 550.

The exterior surface of the core 548 is provided with an array of grooves 562 which receive O-ring seals 563 therein. The O-ring seals 563 (nine in all, each preferably formed of 90-durometer nitrile rubber) are arranged so as to straddle the grooves 554 provided on the interior of the sleeve and thus isolate each annular groove 554 from communication with the other. The lower end of the core 548 is flared outwardly to form a lower collar 564 (having a diameter flush with the diameter of the sleeve 550). Disposed within the core 548 are radial conduction channels 565 and axial conduction channels 566 (some of which are illustrated in FIG. 14) each arranged to communicate with one of the grooves 554 provided in the sleeve 550. The axial channels 566 communicate with radial conduction channels 567 formed in the lower collar 565 of the core 548. The radial conduction channels terminate at termini ports 568 provided at the surface of the lower collar 565. The cover plate 552 abuts the upper end of the core 548 to maintain the proper radial registration between the conduction channels disposed within the core 548 and the grooves 554 and corresponding ports 558 provided within the sleeve 550. Although not all of the sleeve nozzles 556, ports 558, grooves 554, and conduction channels 565-567 are illustrated in FIG. 14, each sleeve nozzle (eight in all) communicates with only one conduction channel 566-567 through an associated port 558 and groove 554.

From the foregoing it may be readily appreciated that the necessary hydraulic fluid lines carrying pressurized hydraulic fluid and fluid returns to and from the elements disposed beneath the operating deck 26 may be accomplished through the use of the rotary swivel 50. The appropriate fluid inlet and return connections between the valve bank 36 provided in the operating cab 30 and the sleeve 550 may be accomplished by the provision of suitable hydraulic tubing or hosing from the valve bank to the appropriate nozzles 556, ports 558 and grooves 554 provided on the sleeve 550. The fluid connections to the operators disposed beneath the deck 26 in the supported relationship on the chassis 12 may be effected by the connection of hydraulic tubing or hosing to the terminii 568 of the conduction channels 565-567 provided in the core 548 and then to the appropriate hydraulic motor or ram.

The interconnections to the ports 558 in the sleeve 550 and from the conduction channels 565-567 in the core 548 are indicated arranged as follows:

| SLEEVE PORTS | FLUID OPERATOR | CORE TERMINI |
| --- | --- | --- |
| 1 | Drive Wheel | A |
| 3 | Motor 246A | C |
| 2 | Drive Wheel | B |
| 4 | Motor 246B | D |
| 5 | Motors 80, 104 | E |
| 6 | 334 (In Series) | F |
| 7 | Case Drain, 246A, 246B, Ram 424 | G |
| 8 | Skirt Lift Ram (Return via Port 7, Termini G) | H |

Referring to FIGS. 16 and 17, shown are more detailed views of the mounting arrangement for the hydraulic motor 134 disposed at the distal end of the loading boom 16. A rectangular end plate 602 is affixed, as by welding, to the axial end of the innermost telescoping member 118C. A base 604 extends axially forwardly from the end plate 602, with upstanding sidewalls 606A and 606B disposed along each side edge of the base 604. The hydraulic motor 134 is secured by its mounting flange 134A to the end plate 602 by bolts 610.

The axially extending coupling 136 is keyed to the body 134B of the hydraulic motor 134 by a key member 618. The coupling 136 projects axially through a central opening provided in a bearing housing 620 mounted at the forward edge of the base 604 between the sidewalls 606.

At a point on the coupling 136 beyond the bearing housing 620 a reduced portion of the coupling 136 receives a transversely extending pivot pin 624 which secures clevis arms 18A on the scoop 18 to the coupling 136 to thereby define the pivotal interconnection 138 between the scoop 18 and the loading boom 16. On the exterior of the coupling 136 the ear 148 is welded or otherwise suitably attached. The cylinder 146C of the ram 146 is mounted by a dowel 146D-1 to the ear 148, while the piston 146P of the ram 146 is pivotally secured by a dowel pin 146D-2 to a clevis arm 18B disposed at the top edge of the scoop 18 to thereby define the pivotal interconnection 150.

An inner bearing race 626I is circumferentially secured about the exterior of the coupling 136 within the bearing housing 620. The race 626I cooperates with a cimcumferentially disposed outer race 626O to receive ball bearings 628 therein. The outer race 626O is confined within the housing 620 by an annular face plate 630 which is affixed to the front of the housing 620 by an array of threaded bolts 632.

When motive fluid is applied to the motor 134, the coupling 136 rotates in the direction of the arrows 144, causing the scoop 18 to rotate about the axis of the boom 16. The pivotal movement in the direction of the arrows 152 of the scoop 18 is effected by the alternate presurization and relief of the ram 146.

With reference to FIG. 18, shown is the detailed schematic diagram of the hydraulic control circuitry of the apparatus 10. The hydraulic fluid reservoir tank 40 (FIGS. 1 and 2) mounted on the rear portion of the operating deck 26 is connected by a fluid line 652 to the inlet of the pump/compressor 42. As noted earlier, the pump/compressor is preferably the AP40 model manufactured and sold by Hydreco, although other pressure compensated pumps equal in capability may be used. The line 652 is fabricated of two-inch inside diameter hose (or two-inch, schedule 40 piping) with the line 652 being reduced to a one and one-half inch outer diameter at the pump. Any suitable hosing or tubing utilized should exceed two thousand pounds, which is the system operating pressure.

The case drain for the pump/compressor 42 is returned to the tank return line 654 by a drain line 656. The drain line 656 is preferably one-half inch outer diameter tubing (or one-half inch inside hose). A fluid filter 658 is disposed in the tank return line 654 just before the inlet of the reservoir 40. Also disposed within the reservoir tank 40 is a screen filter 660, preferably of two-inch pipe size, having size 100 mesh such as that sold by Schroder Corp. under model number SKB-2. Suitable for use as the fluid filter 658 is the filter manufactured by Schroder Corp. and sold under model number RT1-K1D-PP-½. It is preferred that a minimum fluid head be disposed one foot above the top of the screen.

The pump/compressor 42 is driven by the diesel engine 44 and the hydraulic fluid, pressurized to a preferably system operating pressure of two thousand pounds per square inch, is provided to the pump/compressor outlet line 664, preferably one-inch outer diameter tubing. The pressurized line 664 is connected to the inlet port of a manually operated system flow control device 666. Suitable for use as the manual system flow control device is a selector valve, such as that manufactured by Cross Corp. and sold under model number 3818. If the selector valve is utilized, a limit switch 668 is connected in the engine starter circuit 670. The limit switch is arranged to have its contacts closed when hydraulic fluid is diverted to the reservoir tank, as is discussed herein. One outlet port of the flow control device 666 is connected by a return line 672 to the tank return line 654. Suitable for use as the return line 672 is a one-inch outside diameter tube (or a one-inch inside diameter hose).

The second outlet port of the flow control device 666 is connected by a fluid supply line 674 (preferably a one-inch outside diameter tube or a one-inch inside diameter hose) to the inlet manifold of the valve bank 36. The valve bank 36, which contains eight control valves maniputed by the levers 34, is manufactured by Vickers Corp. and sold under model number CM11NO2F-DDDD L21. The outlet port 676 of the manifold is connected directly into the tank return line 654.

Pressurized fluid supply to the motor 60, which powers the rotary motion of the operating deck 26 (FIGS. 12 and 13) is carried by a branch line 680 extending from the pressurized fluid line 674, through a flow controller 682, to the inlet port of a four-way foot-operated spring return valve 684. The branch line 680 is preferably one-half inch inside diameter hose (or one-half-inch outer diameter tubing), while the flow controller is a restrictor manufactured by Rego Corp. and sold under model number N-500S. The four-way valve is preferably manufactured by Vickers Corp. and sold under model number CM11NO2R20DE21.

One of the outlet ports of the vale 684 is connected by a return line 686 to the tank return 654. Each of the other two outlet ports of the valve 684 is respectively connected by one-half inch inside diammeter hoses 688A and 688B to opposite sides of the motor 60. The valve 684 is controlled by pedals 38L and 38R mounted in the cab 30. Manipulation of the pedal 38L causes flow in one direction (e.g., from the line 688A through the motor 60 to the line 688B) to rotate the deck 26 in a left-hand direction 58L (a counter-clockwise direction in FIG. 2). Manipulation of the other pedal 58R causes flow in an opposite direction, reversing the rotation of the motor 60, and rotating the deck 26 in the opposite direction 58R (i.e., clockwise in FIG. 2).

The valves in the valve bank 36 are operated by the control levers 34 extending therefrom. From left-to-right in FIG. 18 the levers 34 respectively control flow through the valves to initiate the following motion of the elements of the apparatus:

| Lever | Element |
| --- | --- |
| 34A | left drive wheel motor 246A (FIG. 3); |
| 34B | boom ram 156 (FIGS. 1, 2, 12); |
| 34C | scoop ram 144 (FIGS. 1, 2, 16, 17); |
| 34D | motors 80, 106 and 334 (FIGS. 1, 2, 3); |
| 34E | scoop motor 136 (FIGS. 1, 2, 16, 17); |
| 34F | skirt left ram 424 (FIGS. 3, 10); |
| 34G | boom extension ram 130 (FIGS. 1, 2); and, |
| 34H | right drive wheel motor 246B (FIG. 3). |

Those circuits which do not utilize the hydraulic swivel 50 are discussed first.

The ram 128, which controls the extension and retraction of the loading boom 16 in the direction of arrows 132 is controlled by the oeprating lever 34G. The lever 34G controls a four-way, spring-loaded valve 690. Manipulation of the lever 34G is a first direction (e.g., toward the control panel) opens the valve 690 in such a way as to pressurize the cylinder 128C of the ram 128 over a line 692A while drain the cylinder over the line 692B. The boom 16 is thus extended in the forward direction 132E. Manipulation of the lever 34G in the opposite direction reverses the pressure and drain lines 692, and retracts the ram 128 in the direction 132R. The lines 692 are preferably three-quarter inch inside diameter hose.

The extension and retraction of the scoop 18 is controlled by the lever 34C, which operates a four-way, spring-loaded valve 696. One outlet line 698A from the valve 696 is connected to the cylinder 146C of the ram 146 on one side of the piston 146P, while a second line 698B is connected to the cylinder 146C on the opposite side of the piston 146P. Manipulation of the lever 34C in a first direction (e.g., to the panel) extends the scoop 18 in the direction 152E by pressurizing the line 698A and draining the other side of the cylinder over the line 698B. The opposite motion of the scoop (in the direction 152R) is generated by the opposite movement of the lever 34C, which reverses the pressure and drain functions of the line 698. The lines 698 are preferably one-quarter inch inside diameter hoses and extend to the ram 146 over the reel 140 (FIG. 1).

The rotation of the scoop 18 is controlled by the motor 134. Flow to the motor 134 is controlled by a four-way spring-loaded valve 702, which when manipulated by the lever 34E in a first direction (e.g., clockwise on the panel), causes flow in a path through a line 704A, through the motor 134 and return through the line 704B. The scoop 18 is thus rotated in a clockwise direction 144R (as viewed from the front of the apparatus). Opposite manipulation of the lever 34E reverses the flow and motor rotation, thus reversing the direction (to a counterclockwise motion 144L) of the scoop 18. The lines are preferably one-quarter inch inside diameter and extend to the motor 134 over the reel 154 (FIG. 2).

The pivotal motion of the boom 16 is powered by the ram 157. The lever 34B controls a four-way, spring-loaded valve 76. The lever 34B regulates the valve 706, which is turn controls the flow of fluid in lines 708A and 708B. The lines 708, preferably three-quarter inch inside diameter hoses, are connected to the cylinder 157C of the ram on opposite sides of the piston 157P therein. Manipulation of the lever 34B (e.g., toward the operator) causes a pressurized fluid flow in the line 708A (and drainage in the line 708B from the opposite side of the piston 157P) to thereby pivotally move the distal (scoop) end of the boom 16 in the upward direction 158U. Manipulation of the lever 34B in the opposite direction reverses the pressure and drain functions of the lines 708, and causes the scoop-end of the boom 16 to pivot in the downward direction 158D.

Figure 15:
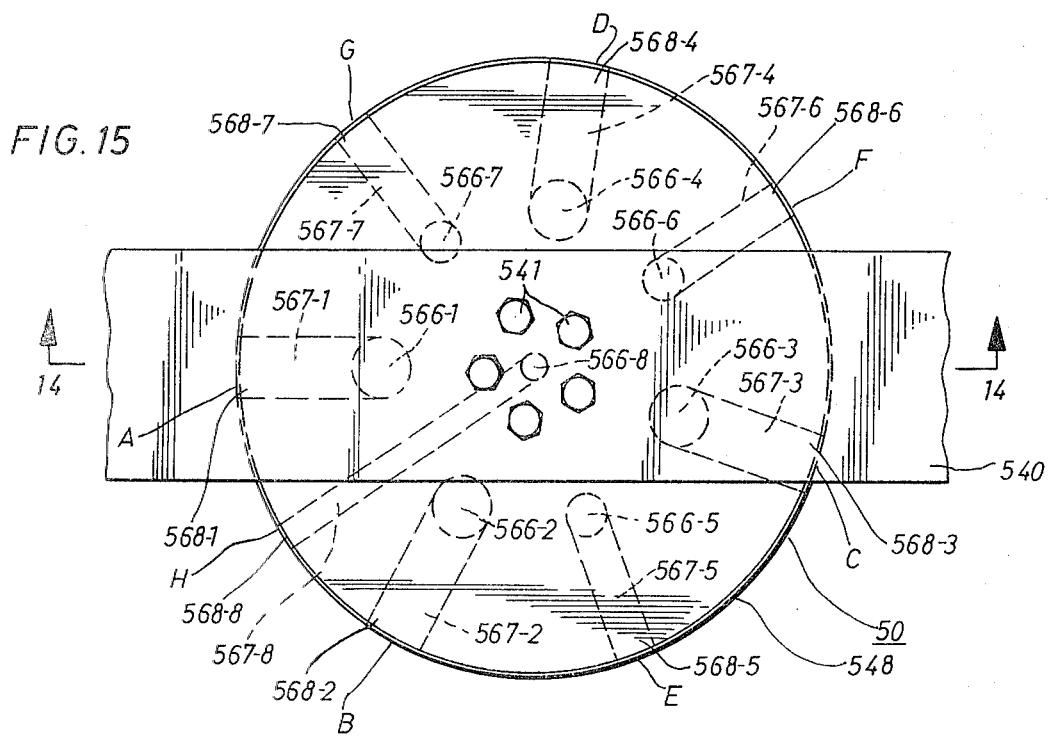
FIG. 15 is a bottom view, taken along view lines 14—14 in FIG. 15, showing the mounting of the hydraulic swivel on the interior of the central post structure on a material handling apparatus in accordance with the instant invention.

The others of the levers 34 control valves which regulate flows in fluid circuits which include the hydraulic swivel 50, as described in connection with FIGS. 14 and 15.

The lever 34A controls a four-way, spring-loaded valve 710, which is connected by lines 712A and 712B to the motor 250A. The line 712A enters the sleeve 550 of the swivel 50 at port 1 and exits the core 548 to one side of the motor 250A through conduction channel terminus A. The line 712B extends to the sleeve 550 and enters through port 3, with the flow exiting through core terminus C to the other side of the motor 250A. The lines 712 are three-quarter inch inside diameter hoses on each side of the swivel. Manipulation of the lever 34A in a first direction causes flow through the motor 246A through the pressure line 712A and drain line 712B. Opposite manipulation of the lever 34A pressurizes the motor 250A through the line 712B and drains through the line 712A. The case drain of the motor 250A is a one-half inch inside diameter hose 714A which is connected to core terminus G and is connected by a line 716 (also one-half inch inside diameter hose) to the sleeve port 7 to the tank return line 654.

The lever 34H at the opposite end of the valve bank panel controls a four-way, spring-loaded valve 720 (identical to the valve 710) which is connected by lines 722A and 722B to the motor 250B. The line 722A enters the sleeve 550 at port 2 and exits the core 548 to one side of the motor 250B at the channel terminus B. The line 722B extends to the sleeve 550 to the port 4 therein, with the connection to the other side of the motor occurring at core terminus D. The lines 722 are identical to the lines 712. Manipulation of the lever 34H in a first direction causes flow through the motor 250B through the pressure line 722A and return through the line 722B. The manipulation of the lever 34H in the opposite direction receives the flow path and the direction of rotation of the motor 250B. The case drain of the motor 250B is connected by a one-half inch inside diameter hose 714B to the drain line 714A, at a node 714N.

The skirt is lifted under the control of the lever 34F, which controls a three-way valve 726. A line 728A extends from the valve 726 to the sleeve 550, at port 8 thereof and to the cylinder 426C of the ram 426 from the core terminus H. The other side of the cylinder 426C opposite the piston 426P is connected by a line 728B which is connected to the case drain 714A at the node 728N. The skirt 24 is lifted in the direction by manipulation of the lever 34F, which pressurizes the line 728A as the cylinder drains through the line 728B. The skirt 24 returns by its own weight when the line 728A is relieved.

The motive sources for the carry-off conveyor 88, the deflector conveyor 68 and the turntable 14 are connected in series to a valve 734, which is manipulated by the lever 34D. The valve 734 is a two-way control valve. The valve 734 is connected by a line 736 to one side of the motor 106 for the carry-off conveyor 88. The line 736 passes through the hydraulic swivel 50, with the line entering the sleeve 550 at port 5 and extends from the core 548 at the terminus E thereof. The line 736 is connected to a two-way ball check valve 738. The valve 738 is connected in series to the inlet side of the motor 106 by a line 740. The other side of motor 106 is connected in series to the first side of the motor 80 for the deflector conveyor 68 by a line 742. The outlet side of the motor 80 is connected to the inlet of the turntable drive motor 334 by a line 744. The outlet of the motor 334 is connected through the swivel to the top of the deck 26 by a line 746. The line 746 enters the core at the terminus F thereof and exits the sleeve through the port 6 therein. From the sleeve, the line 746 is connected to a flow controller 748, such as that manufactured by Rego Corp. and sold under model number N-500S. A line 750 connects the flow controller 748 to the valve 734. All the lines are one-half inch inside diameter hoses.

Since the carry-off conveyor 88, the deflector conveyor 68 and the turntable 14 all rotate in only one direction, the only flow path is that set forth above. The valve 738 is provided on the conveyor 88 to stope the motion of the conveyors at the discretion of the operator. Since the speeds of the conveyors 88, 68 and the turntable 14 are related, as set out above, the series connection automatically generates pressure drops which provide the desired interrelationship between the speeds of the conveyors 88 and 68 and the turntable 14.

The preferred relationship is that the speed of the conveyor 88 should exceed the speed of the conveyor 68 which in turn exceeds the speed of the radial outward-most point on the turntable 14. The speeds of these elements may also be proportionally related one to another, if desired. The speeds are regulable by the flow controller 748.

Figure 19A:
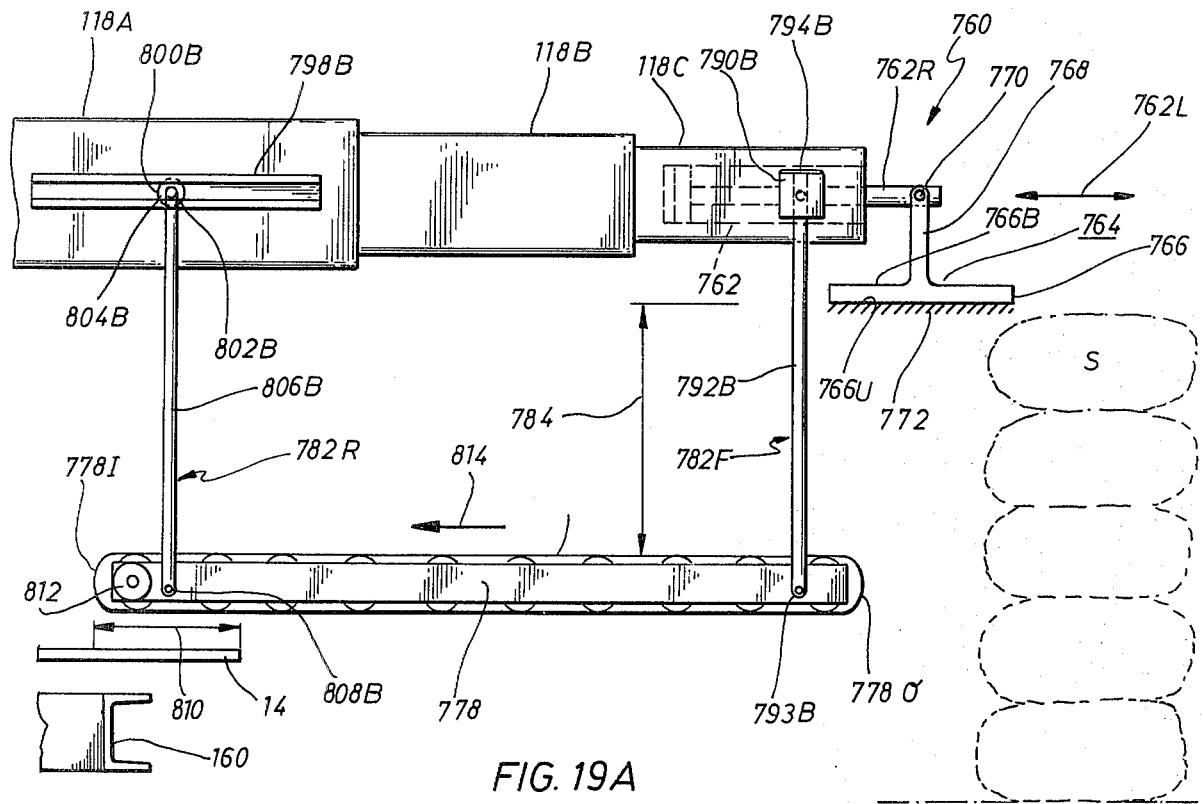
FIGS. 19A and 19B are, respectively, a side elevation and a plan view of a modified loading device arrangement used in connection with a material handling apparatus in accordance with the instant invention.
Figure 8:
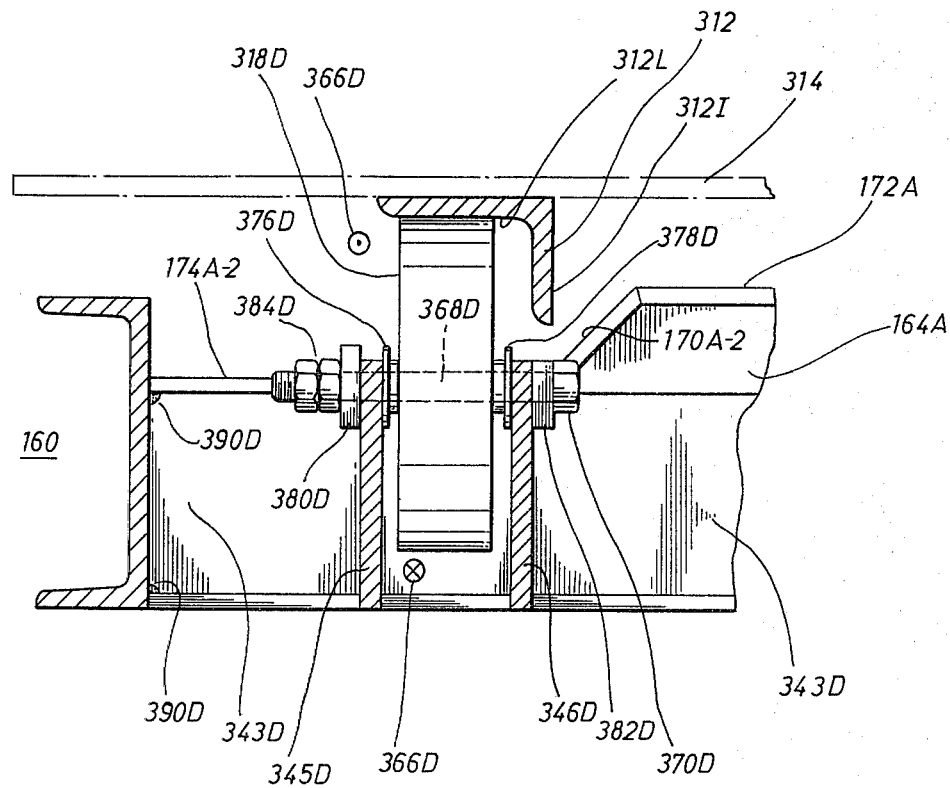
FIG. 8 is a view taken along section lines 8—8 of FIG. 3 showing mounting arrangement for a turntable support wheel for a material handling apparatus in accordance with the instant invention.
Figure 19B:
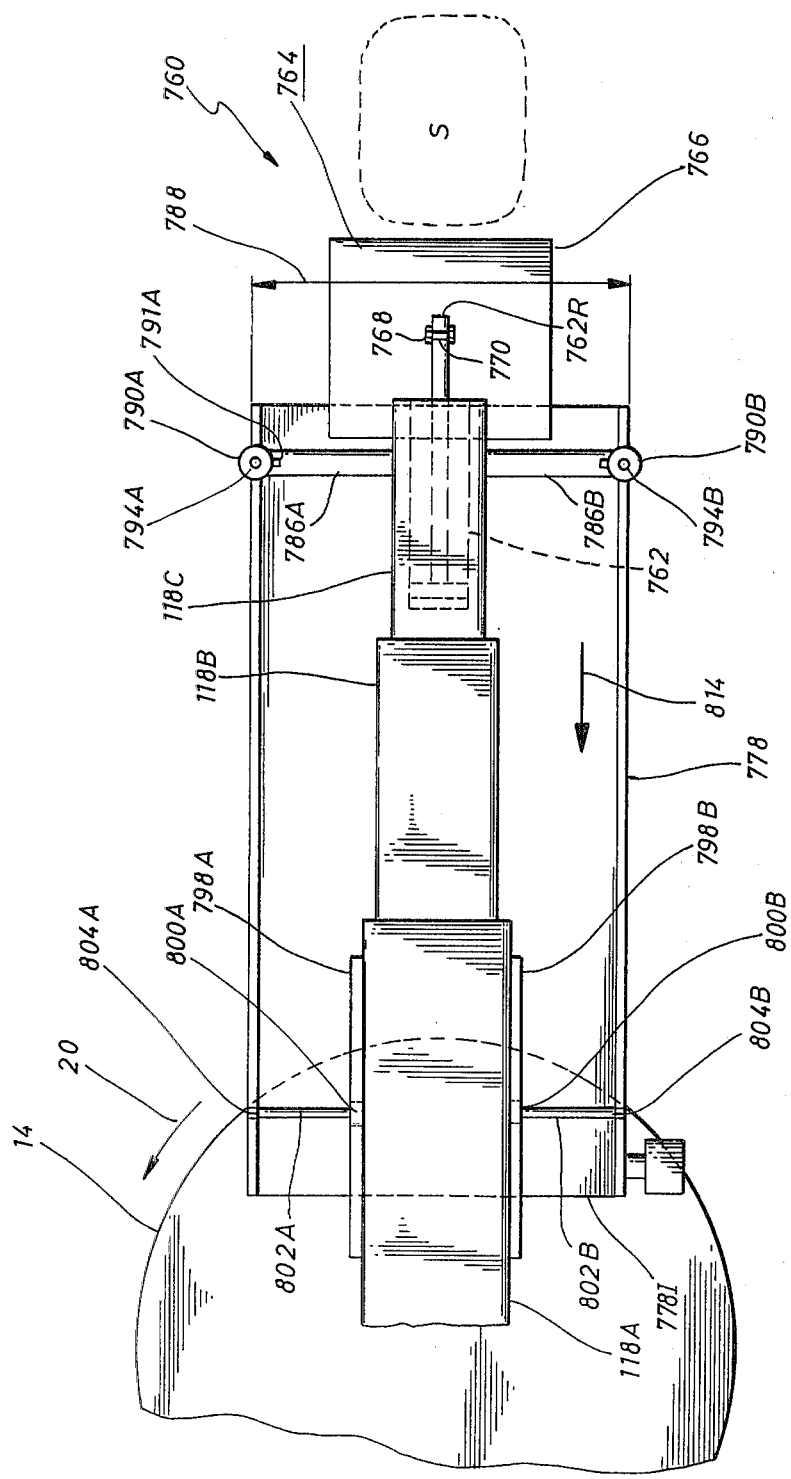

With reference now to FIGS. 19A and 19B, shown is a modified loading device, generally indicated by reference character 760, useful in connection with a material handling apparatus in accordance with the instant invention.

As seen in FIG. 19, the outer end of the innermost telescoping member 118C receives the cylinder of a hydraulic ram 762. A sack grasping device 764 pivotally depends from the axially outer end of the piston rod 762R of the ram 762. The sack grasping device 764 includes a substantially planar portion 766 having ears 768 extending upwardly from the back surface 766B thereof. The ears receive a dowel 770 which defines the pivotal interconnection between the grasping device 764 and the piston rod 762R.

The undersurface 766U of the planar portion 766 has a roughened, sack-grabbing surface thereon. The roughened sack-grabbing surface may be defined by any suitable expedient, as by an array of downwardly angled pins 772. Of course, any suitable arrangement which, when moved over the surface of a sack of material, urges that sack in the direction of motion of the sack grasping device 764 lies within the contemplation of this invention. The sack grasping device 764 is reciprocable in directions along the axis 762L of the ram 762 by alternate pressurization and relief of the ram 762. Suitable hydraulic connections for the ram are, of course, provided. Since in this embodiment the motor 134 and the ram 146 are not used, it is possible to utilize one of the hose reels 140 or 154 to effect this connection.

Depending from the boom 16 is a forward carry-on conveyor 778. The forward carry-on conveyor is suspended below the boom 16 by forward and rear mountings 782F and 782R, respectively. The upper conveyance surface 778U of the conveyor 778 is spaced a predetermined distance 784 below the sack-grasping surface disposed on the undersurface 776U of the planar portion 766 of the sack-grasping device.

The forward mounting 782F includes laterally outwardly extending support members 786A and 786B mounted on opposite side of the innermost telescoping member 118C. The span of the support members is slightly wider than the width of the carry-on conveyor 778. Disposed at the outward end of each support member 786 is a tubular sleeve 790. The sleeves 790 are rotatably mounted as at 791 at the ends of the support members 786. Vertically extending members 792 (each having an enlarged head 794 thereon) are slidably received within the sleeves 790. The lower ends of the members 792 are pivotably mounted, as at 793, to a sidewall of the carry-on conveyor 778 adjacent the forward, outboard, end thereof.

The rear mounting 782R includes a guide track 798 mounted to each side of the outer telescoping member 118A. Rollers 800 are received in each of the tracks 798, the axles 802 of the rollers extending sideways from the boom 16. At the outer end of each of the axles 802 is pivotally mounted, as at 804, a rear vertical member 806. The lower end of each rear vertical member is pivotally mounted, as at 808, to the sidewalls of the carry-on conveyor 778 adjacent the rear, inward end thereof.

The carry-on conveyor 778 is, in this manner, suspended in a depending relationship beneath the boom 16. The carry-on conveyor exhibits a length such that the inward end 778I thereof overlies the edge of the material conveyance surface by a predetermined distance 810 and the outer end 778O of the carry-on conveyor 778 lies beneath the sack-grasping member 764 when that member is in the retracted position (shown in FIG. 19). It is important that the inner end 778I of the carry-on conveyor 778 lie within the dimensions of the material conveyance surface 14 throughout the extension and retraction of the boom 16. Further, it is also important that the outer end 778O of the carry-on conveyor lie in proximity to the sack-grasping member 764 so that sacks of material (shown in dot-dash lines in FIG. 19) when grasped by the surface 766U as the piston rod 762R is retracted (in the direction 762I) will be urged onto the carry-on conveyor 778.

The conveyor 778 is driven by any suitable drive motor 812 in the direction of motion 814. The motor 812 may be mounted on any convenient position on the carry-on conveyor 778. The hydraulic connections for the motor 812 are suitably provided, it be possible that the other of hose reels 140 or 154 may be utilized for these connections.

In operation, the sack-grasping device 764 is reciprocally movable along the axis 762L of the ram 762 in accordance with the pressurization and relief of each side of the piston 762P of the ram. When extended, the sack-grasping device 764, and particularly the undersurface 766U thereof, grabs one of the sacks. As the device 764 is retracted, the sack is urged onto the carry-on conveyor. The carry-on conveyor 778 carries the sack inwardly in the direction of arrow 814, whereupon the sack leaves the inward edge 778I of the carry-on conveyor and is deposited onto the material conveyance surface. Due to the action of the carry-on conveyor 778 and due to the overhang distance 810, the sack tends to be disposed on the conveyance surface 19 radially inwardly of the edge thereof.

The extension and retractions of the boom 16 is accomodated by movement of the rollers 800 within the tracks 798 so, at all times, theinward edge 778I of the carry-on conveyor 778 lies at least the predetermined distance 810 over the material conveyance surface 14. The pivotal connections 793 and 808 between the vertical support members 792 and 806 with the conveyor 778 respectively, as well as the pivotal connection 791 between the sleeves 790 with the members 786 and the connection 804 between axles 802 with the vertical members 806 permit the carry-on conveyor to accomodate the pivotal movement of the boom 16. In addition to the pivotal connections discussed, if the boom 16 pivots to dispose the outward edge 778O of the conveyor 778 on the work floor, the vertical members 792 are also slidable within the sleeves 790 to further accommodate such motion.

In some instances, it may be desirable to extend the length of the tracks 798 past the forward end of the innermost telescoping member 118A in order to increase the travel distance available to the rollers 800. It is also noted that in FIGS. 19A and 19B the ram 128 (FIGS. 1 and 2) has been ommited for clarity.

From the foregoing, it may be appreciate that the instant invention, when embodied in a self-contained, movable material handling vehicle is adapted to permit a single operator to expeditiously handle the unloading of cargo (whether loose of sacked) from a boxcar, trailer or other carrier. The apparatus in accordance with the instant invention is adapted for movement about a workfloor through the provision of drive wheels, treads or rail and track, if the situation warrants. The material conveyance surface, adapted for rotation preferably about the central vertical axis of the apparatus conveys material deposited thereon to the vicinity of a deflector conveyor, which deflects the material to a carry off conveyor and then to other suitable conveyors, if appropriate. Since the carry-off conveyor and the deflector conveyor are movable as a unit with respect to the chassis of the apparatus, these elements may at all times remain oriented to convey material toward the access doorway of the carrier. Since the loading boom is mounted for rotation with respect to the chassis by virtue of its mounting on the rotatable operating deck, the boom may be extended and retracted to draw material toward the conveyance surface from any position of repose within the carrier. The boom, and the suitable loading device positioned on the outward end thereof, is pivotal in a vertical plane which includes the central axis of the device. Furthermore, the loading device is pivotal and rotatable with respect to the boom to assist in the deposition of material onto the conveyance surface. Further assisting the guidance of material onto the conveyance surface is a skirt mounted to the chassis for lifting and lowering movement with respect to the workfloor.

Having described the preferred embodiment of the invention, those skilled in the art, having the benefit of the teachings discussed herein, may effect modifications thereto. Such modifications, including but not limited to the substitution of equivalent elements, reversal of element positions, or any modifications lying within the skill of the art, are to be construed as lying within the contemplation of this invention, the scope of which is defined in the appended claims.

What is claimed is:

1. A material handling apparatus comprising:
   a chassis;
   a material conveyance surface mounted for a predetermined rate of rotation with respect to the chassis; and
   a loading boom having a loading device at the end thereof, the boom being mounted to but extendable from the chassis for loading material onto the material conveyance surface, and the boom being rotatable in a horizontal plane about a vertical axis which extends from the chassis and is coincident with the axis of rotation of the material conveyance surface to dispose the loading device at any angular position in a predetermined sector of the horizontal plane measured from the vertical axis.

2. A material handling apparatus according to claim 1, in which the material conveyance surface is adapted to be driven such that the rate of rotation of the material conveyance surface is independent of the loading of material thereonto.

3. Apparatus according to claim 1, wherein the sector is at least 180°.

4. Apparatus according to claim 1 further comprising a prime mover mounted to the frame for moving the apparatus.

5. Apparatus according to claim 1 wherein the loading boom is pivotable in a vertical plane about a horizontal axis of the chassis.

6. Apparatus according to claim 5 wherein the vertical plane contains the axis of rotation of the material conveyance surface.

7. Apparatus according to claim 5, further comprising a carry-on conveyor for receiving material displaced by the boom, the carry-on conveyor having an inner end positioned proximate the conveyance surface to carry material onto the conveyance surface.

8. Apparatus according to claim 7, in which the carry-on conveyor is pivotably mounted on the apparatus for pivotal displacement in a vertical plane about its inner end.

9. Apparatus according to claim 7 or claim 8, in which the loading boom and the carry-on conveyor are mounted for rotatable displacement in a horizontal plane about a vertical axis extending from the chassis.

10. Apparatus according to claim 9, in which the carry-on conveyor is mounted for displacement by the boom.

11. Apparatus according to claim 1 further comprising a deflector connected to the chassis to deflect from the material conveyance surface material deposited thereon.

12. Apparatus according to claim 11 further comprising a carry-off conveyor mounted to the chassis and disposed so as to receive material deflected by the deflector from the material conveyance surface.

13. Apparatus according to claim 12 wherein the deflector is a conveyor element mounted such that the conveyance surface thereof is perpendicular to the material conveyance surface, and wherein the carry-off conveyor and the deflector are adapted to be driven relatively to the material conveyance surface during use for the speed of any point on the carry-off conveyor to be greater than the speed of any point on the conveyance surface of the deflector conveyor, and for the speed of the conveyance surface of the deflector conveyor to be greater than the rotational speed of any point on the material conveyance surface.

14. Apparatus according to claim 12 wherein the deflector conveyor and the carry off conveyor are mounted as a unit and are movable to any angular location within a sector of a horizontal plane defined with respect to the vertical axis of rotation of the material conveyance surface.

15. Apparatus according to claim 11 wherein the deflector is a conveyor element mounted such that the conveyance surface thereof is perpendicular to the material conveyance surface, and wherein the deflector is adapted to be driven relatively to the material conveyance surface during use for the speed of any point on the conveyance surface of the deflector conveyor to be greater than the rotational speed of any point on the material conveyance surface.

16. Apparatus according to claim 15 wherein the deflector conveyor is movable to any angular location within a sector of a horizontal plane defined with respect to the vertical axis of rotation of the material conveyance surface.

17. Apparatus according to claim 11 wherein the deflector is movable to any angular location within a sector of a horizontal plane defined with respect to the vertical axis of rotation of the material conveyance surface.

18. A material handling apparatus comprising:
   a chassis;
   a turntable mounted for continuous rotation with respect to the chassis;

a deck mounted to the chassis above the turntable, the deck being rotatable with respect to the chassis independently of the turntable; and, a loading boom having a material scoop at one end thereof, the boom being mounted to the deck at the other end thereof, the boom being extendable along its axis to dispose the scoop into contact with material to be handled and, once extended, retractable to move material onto the turntable.

19. Apparatus according to claim 18 wherein the axis of rotation of the deck is coincident with the axis of rotation of the turntable, the boom being thereby rotatable with the deck to any angular position within a sector of a plane extending perpendicularly to the axis of rotation of the turntable.

20. Apparatus according to claim 19 wherein the sector is at least 180°.

21. Apparatus according to claim 19 wherein the loading boom is pivotable about a horizontal axis in a vertical plane containing the axes of rotation of the turntable and the deck.

22. Apparatus according to claim 21 wherein the scoop is rotatable about the axis of the loading boom.

23. Apparatus according to claim 18 wherein the loading boom is pivotable about a horizontal axis in a vertical plane containing the axis of rotation of the turntable.

24. Apparatus according to claim 23 wherein the scoop is rotatable about the axis of the loading boom.

25. Apparatus according to claim 18 wherein the scoop is rotatable about the axis of the loading boom.

26. Apparatus according to claim 18 further comprising a deflector connected to the chassis to deflect material deposited on the turntable from the turntable.

27. Apparatus according to claim 26 wherein the deflector comprises a conveyor the conveyance surface of which is disposed perpendicularly to the plane of the turntable, the speed of any point on the conveyance surface of the deflector conveyor being greater than the speed of any point on the turntable.

28. Apparatus according to claim 27 further comprising a carry-off conveyor movable at a predetermined speed the carry-off conveyor being connected to the chassis and disposed so as to receive material deflected from the turntable by the deflector conveyor, the speed of any point on the carry-off conveyor being greater than the speed of any point on the conveyance surface of the deflector conveyor.

29. Apparatus according to claim 27 wherein an axis through the deflector conveyor extends radially outwardly from the axis of rotation of the turntable in a plane perpendicular thereto, the deflector conveyor axis defining a predetermined angle with respect to a central vertical plane extending through the apparatus and containing the axis of rotation of the turntable.

30. Apparatus according to claim 29 further comprising:

a carry-off conveyor being movably connected to the chassis and disposed so as to receive material deflected from the turntable by the deflector conveyor, the deflector conveyor being mounted to the carry-off conveyor so that they may move as a unit to vary the angle defined between the axis of the deflector conveyor and the central vertical plane of the apparatus, the carry-off conveyor being movable such that the speed of any point on the carry-off conveyor is greater than the speed of any point on the conveyance surface of the deflector conveyor.

31. Apparatus according to claim 29 wherein the deflector conveyor is movable with respect to the chassis to vary the angle defined between the axis of the deflector conveyor and the central vertical plane of the apparatus.

32. Apparatus according to claim 26 further comprising a carry-off conveyor connected to the chassis so as to receive material deflected from the turntable by the deflector.

33. Apparatus according to claim 18 further comprising:

means mounted to the chassis for moving the apparatus with respect to a workfloor.

34. Apparatus according to claim 33 wherein the moving means comprises:

a first and a second drive wheel mounted to the chassis and connected to a source of motive energy therefor, an idler wheel mounted to the chassis and pivotal in a full circular arc with respect thereto, the drive wheels being arranged such for energization independently or concurrently to move the apparatus in any direction across the workfloor.

35. A material handling vehicle comprising:

a chassis;

a turntable mounted for continuous rotation with respect to the chassis;

a deck mounted to the chassis above the turntable, the deck being rotatable with respect to the chassis independently of the rotation of the turntable;

a loading boom mounted to the deck, the boom having a loading device disposed at the end thereof, the boom being pivotal in a vertical plane containing the axis of rotation of the deck about a horizontal axis extending through the mounting of the boom to the deck, the boom being rotatable with the deck and extendable and retractable along its axis, the rotation of the deck and extension of the boom being adapted to dispose the loading device into contact with material disposed at any point within a predetermined sector of a horizontal plane defined perpendicular to the axis of rotation of the deck so that retraction of the boom causes the material to be disposed onto the turntable;

a deflector conveyor mounted to the chassis for deflecting from the turntable material disposed thereunto by the cooperative interaction of the boom and loading device; and, means mounted to the chassis for moving the apparatus about a workfloor.

36. Apparatus according to claim 35 wherein the axis of rotation of the deck is coincident with the axis of rotation of the turntable.

37. Apparatus according to claim 35 further comprising a skirt mounted to the chassis, the skirt tapering forwardly from the chassis with the top edge of the skirt lying in the vicinity of the edge of the turntable.

38. Apparatus according to claim 37 further comprising a lifting arrangement for lifting the skirt with respect to the chassis.

39. Apparatus according to claim 35 wherein the speed of any point on the deflector conveyor is greater than the speed of any point on the turntable.

40. Apparatus according to claim 39 further comprising:

a carry-off conveyor connected to the chassis so as to receive material deflected by the deflector conveyor from the turntable.

41. Apparatus according to claim 40 wherein the speed of any point of the carry-off conveyor is greater than the speed of any point on the deflector conveyor.

42. Apparatus according to claim 41 wherein the deflector conveyor is mounted on the carry-off conveyor, the deflector conveyor and the carry-off conveyor being movable as a unit with respect to the chassis.

43. Apparatus according to claim 35 further comprising:
a carry-off conveyor connected to the chassis so as to receive material deflected by the deflector conveyor from the turntable.

44. Apparatus according to claim 43 wherein the deflector conveyor and the carry-off conveyor are movable with respect to the chassis.

45. Apparatus according to claim 35 wherein the moving means comprises a first and a second drive wheel, the source of motive energy for each drive wheel being mounted to the chassis, and an idler wheel mounted to the chassis.

46. Apparatus according to claim 45 wherein the source of motive energy for the drive wheels is a hydraulic motor connected to each wheel and further comprising a pump for pumping pressurized hydraulic fluid to the motor.

47. Apparatus according to claim 46 wherein the pump is disposed on the surface of the deck and the drive wheels are disposed therebelow, the hydraulic fluid interconnection between the pump and the motors being effected through a swivel having a stationary member connected to the motors and rotary member connected to the pump and mounted for rotation with the deck.

48. Apparatus according to claim 46 wherein each hydraulic motor is mounted to the chassis on a mounting member, each drive wheel being mounted to its associated motor such that the axis of rotation of each drive wheel is perpendicular to a surface of each mounting member, each surface of each mounting member being parallel to the central vertical plane of the apparatus.

49. Apparatus according to claim 35 further comprising:
a carry-on conveyor supported in a depending relationship from the boom, the inner end of the carry-on conveyor lying over and above a portion of the material conveyance surface;
and wherein the loading device on the boom comprises a grasping member reciprocable in a direction parallel to the axis of the boom, the grasping member being extendable to grasp material disposed in the vicinity of the end of the bottom and being retractable to carry the material onto the carry-on conveyor.

50. Apparatus according to claim 41 wherein the carry-on conveyor is supported at each end thereof by forward and rear mounting members, each of the forward and rear mounting members being pivotally mounted at one end to the boom and at the other end to the carry-on conveyor.

51. Apparatus according to claim 50 wherein the rear mounting members are movable with respect to the boom to accommodate the extension and retraction thereof.

52. Apparatus according to claim 35, further comprising a carry-on conveyor for receiving material displaced by the boom, the carry-on conveyor having an inner end positioned proximate the turntable to carry material onto the turntable.

53. Apparatus according to claim 52, in which the carry-on conveyor is pivotably mounted on the apparatus for pivotal displacement in a horizontal plane about the turntable.

54. Apparatus according to claim 52 or claim 53, in which the carry-on conveyor is pivotably mounted on the apparatus for pivotal displacement in a vertical plane about its inner end.

55. Apparatus according to claim 54, in which the carry-on conveyor is mounted for displacement by the boom.

56. A material handling apparatus comprising:
a chassis;
a material conveyance surface mounted for a predetermined rate of rotation with respect to the chassis;
a loading boom having a loading device at the end thereof, the boom being mounted to be extendable from the chassis for loading material onto the material conveyance surface; and
a deflector connected to the chassis to deflect from the material conveyance surface material deposited thereon, the deflector being in the form of a conveyor element mounted such that the conveyance surface thereof is perpendicular to the material conveyance surface, and the deflector being adapted to be driven relatively to the material conveyance surface during use so that the speed of any point of its conveyance surface is greater than the rotational speed of any point on the material conveyance surface.

57. Apparatus according to claim 56, further comprising a carry-off conveyor mounted to the chassis and disposed so as to receive material deflected by the deflector from the material conveyance surface.

58. Apparatus according to claim 57, in which the carry-off conveyor is adapated to be driven during use so that the speed of any point of the carry-off conveyor is greater than the speed of any point on the conveyance surface of the deflector conveyor.

59. A material handling apparatus comprising:
a chassis;
a material conveyance surface mounted for a predetermined rate of rotation with respect to the chassis;
a loading boom having a loading device at the end thereof, the boom being mounted to but extendable from the chassis for loading material onto the material conveyance surface; and
a deflector connected to the chassis to deflect from the material conveyance surface material deposited thereon, the deflector being movable to any angular location within a sector of a horizontal plane defined with respect to the vertical axis of rotation of the material conveyance surface.

60. Apparatus according to claim 59, further comprising a carry-off conveyor mounted to the chassis and disposed so as to receive material deflected by the deflector from the material conveyance surface.

61. Apparatus according to claim 57 or claim 60, wherein the deflector and the carry-off conveyor are mounted as a unit for the carry-off conveyor to be movable with the deflector.

62. A material handling apparatus comprising:
a chassis;
a material conveyance surface mounted for a predetermined rate of rotation with respect to the chassis;
a loading boom having a loading device at the end thereof, the boom being mounted to the chassis but being extendable and retractable relatively to the chassis and relatively to the material conveyance surface for loading material onto the material conveyance surface; and
the loading boom being pivotable about a horizontal axis of the chassis in a vertical plane which contains the axis of rotation of the material conveyance surface.

63. A material handling apparatus comprising:
a chassis;
a material conveyance surface mounted on the chassis for a predetermined rate of rotation with respect to the chassis about a vertical axis extending through the chassis;
a loading boom having a loading device at an end thereof, the loading boom being mounted on the chassis within the outer periphery of the material conveyance surface, to extend from the chassis over the material conveyance surface, and the loading boom being extendable and retractable relatively to the material conveyance surface to displace the loading device relatively to the material conveyance surface for loading material onto the material conveyance surface.

* * * * *